US012608667B1

(12) United States Patent
Rathoure et al.

(10) Patent No.: US 12,608,667 B1
(45) Date of Patent: Apr. 21, 2026

(54) SYSTEMS AND METHODS OF MULTIMODAL INTERACTION-BASED SUPPLY CHAIN EXECUTION USING IMMERSIVE GUIDANCE

(71) Applicant: Blue Yonder Group, Inc., Scottsdale, AZ (US)

(72) Inventors: Pankaj Rathoure, Hyderabad (IN); Mayank Tiwari, Serilingampalle (IN); Santosh Kumar, Ramgarh Cantt (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 125 days.

(21) Appl. No.: 18/439,011

(22) Filed: Feb. 12, 2024

Related U.S. Application Data

(60) Provisional application No. 63/534,261, filed on Aug. 23, 2023, provisional application No. 63/527,742, filed on Jul. 19, 2023, provisional application No. 63/527,740, filed on Jul. 19, 2023, provisional application No. 63/527,736, filed on Jul. 19, 2023, provisional application No. 63/458,325, filed on Apr. 10, 2023, provisional application No. 63/445,163, filed on Feb. 13, 2023, provisional application No.
(Continued)

(51) Int. Cl.
*G06Q 10/0631* (2023.01)
*G02B 27/00* (2006.01)
*G06Q 10/087* (2023.01)
*G06T 19/00* (2011.01)

(52) U.S. Cl.
CPC ... *G06Q 10/06316* (2013.01); *G02B 27/0093* (2013.01); *G06Q 10/087* (2013.01); *G06T 19/006* (2013.01)

(58) Field of Classification Search
CPC .......... G06Q 10/06316; G06Q 10/087; G02B 27/0093; G06T 19/006
See application file for complete search history.

(56) References Cited

U.S. PATENT DOCUMENTS

| | | | |
|---|---|---|---|
| 7,120,486 B2 | 10/2006 | Leuthardt et al. | |
| 9,323,325 B2 * | 4/2016 | Perez | G06F 3/017 |
| 10,571,251 B2 * | 2/2020 | Edwin | H04N 13/383 |

(Continued)

FOREIGN PATENT DOCUMENTS

| | | | |
|---|---|---|---|
| CN | 203802460 U | 9/2014 | |
| WO | WO-2023114116 A2 * | 6/2023 | G02B 27/0093 |

*Primary Examiner* — Dylan C White
(74) *Attorney, Agent, or Firm* — Spencer Fane LLP; Steven J. Laureanti

(57) ABSTRACT

A system and method are disclosed for immersive guidance using a supply chain execution platform. The method comprises monitoring and receiving input comprising user interaction and user input signals, detecting a user intent within a supply chain execution environment from the user input signals, determining associated focus prompts and action prompts, displaying immersive guidance to the user comprising a visual prompt using augmented reality and updating the immersive guidance based on real-time user action updates received from one or more sensing devices. The method further comprises where the user intent further comprises a series of prompts for the user that guide the user through completion of one or more tasks and where the focus prompts are determined based on eye cornea reflection tracking and facial expressions.

14 Claims, 18 Drawing Sheets

Related U.S. Application Data

63/445,161, filed on Feb. 13, 2023, provisional application No. 63/445,154, filed on Feb. 13, 2023.

(56)                References Cited

U.S. PATENT DOCUMENTS

| | | | |
|---|---|---|---|
| 12,266,064 B2 * | 4/2025 | Haddick | G02B 27/0172 |
| 2014/0188270 A1 * | 7/2014 | Stelzer | B65G 1/137 |
| | | | 700/216 |
| 2018/0092706 A1 * | 4/2018 | Anderson | G06F 3/013 |
| 2018/0117446 A1 * | 5/2018 | Tran | G06F 1/163 |
| 2021/0156695 A1 * | 5/2021 | Zhang | G06T 19/006 |
| 2021/0373676 A1 * | 12/2021 | Jorasch | A63F 13/215 |
| 2021/0375048 A1 * | 12/2021 | Kang | G02B 27/0093 |
| 2022/0026721 A1 * | 1/2022 | Jamali | G02B 5/32 |
| 2022/0196889 A1 * | 6/2022 | Marinkovich | H04L 9/3239 |
| 2025/0060824 A1 * | 2/2025 | Osterhout | G06F 3/03542 |
| 2026/0023436 A1 * | 1/2026 | Osterhout | G06F 3/016 |

* cited by examiner

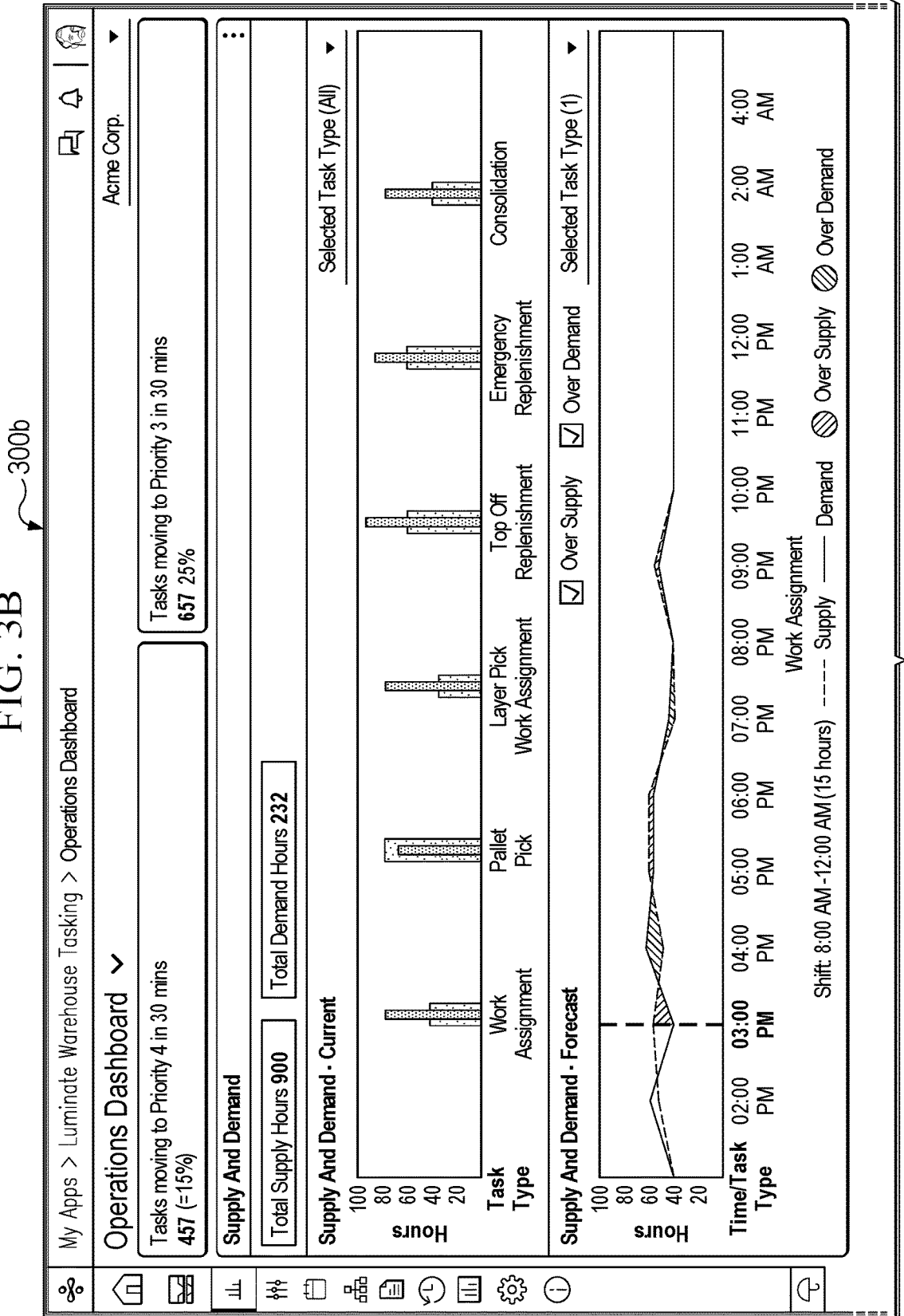

My Apps > Luminate Warehouse Tasking > Operations Dashboard

Acme Corp.

Operations Dashboard ∨

Tasks moving to Priority 4 in 30 mins
457 (=15%)

Tasks moving to Priority 3 in 30 mins
657 25%

Supply And Demand

Total Supply Hours 900    Total Demand Hours 232

Supply And Demand - Current

Selected Task Type (All)

Hours
100
80
60
40
20

Task
Type

Work
Assignment   Pallet
Pick   Layer Pick
Work Assignment   Top Off
Replenishment   Emergency
Replenishment   Consolidation ☑ Over Supply      ☑ Over Demand

Supply And Demand - Forecast

Selected Task Type (1)

Hours
100
80
60
40
20

Time/Task
Type

02:00
PM   03:00
PM   04:00
PM   05:00
PM   06:00
PM   07:00
PM   08:00
PM   09:00
PM   10:00
PM   11:00
PM   12:00
PM   1:00
AM   2:00
AM   4:00
AM

Work Assignment

Shift: 8:00 AM -12:00 AM (15 hours)    ---- Supply —— Demand    ---- Supply —— Demand    ⊘ Over Supply  ⊘ Over Demand

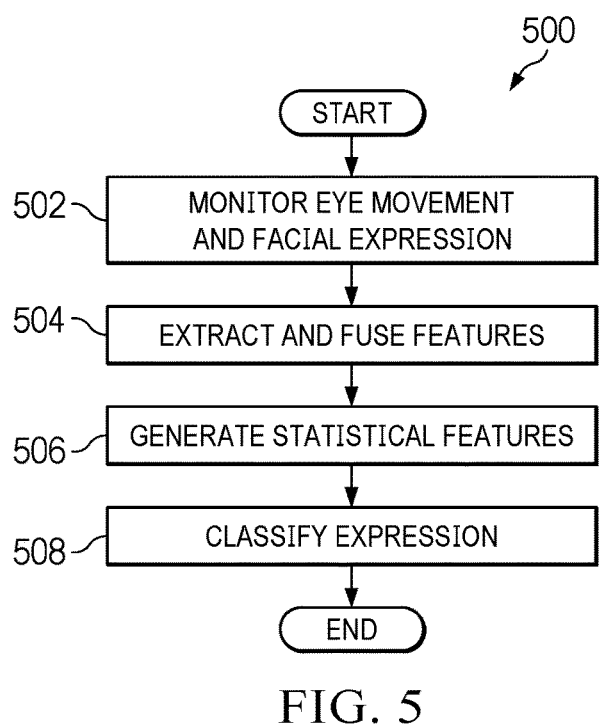

500

START

502 — MONITOR EYE MOVEMENT AND FACIAL EXPRESSION

504 — EXTRACT AND FUSE FEATURES

506 — GENERATE STATISTICAL FEATURES

508 — CLASSIFY EXPRESSION

END

FIG. 5

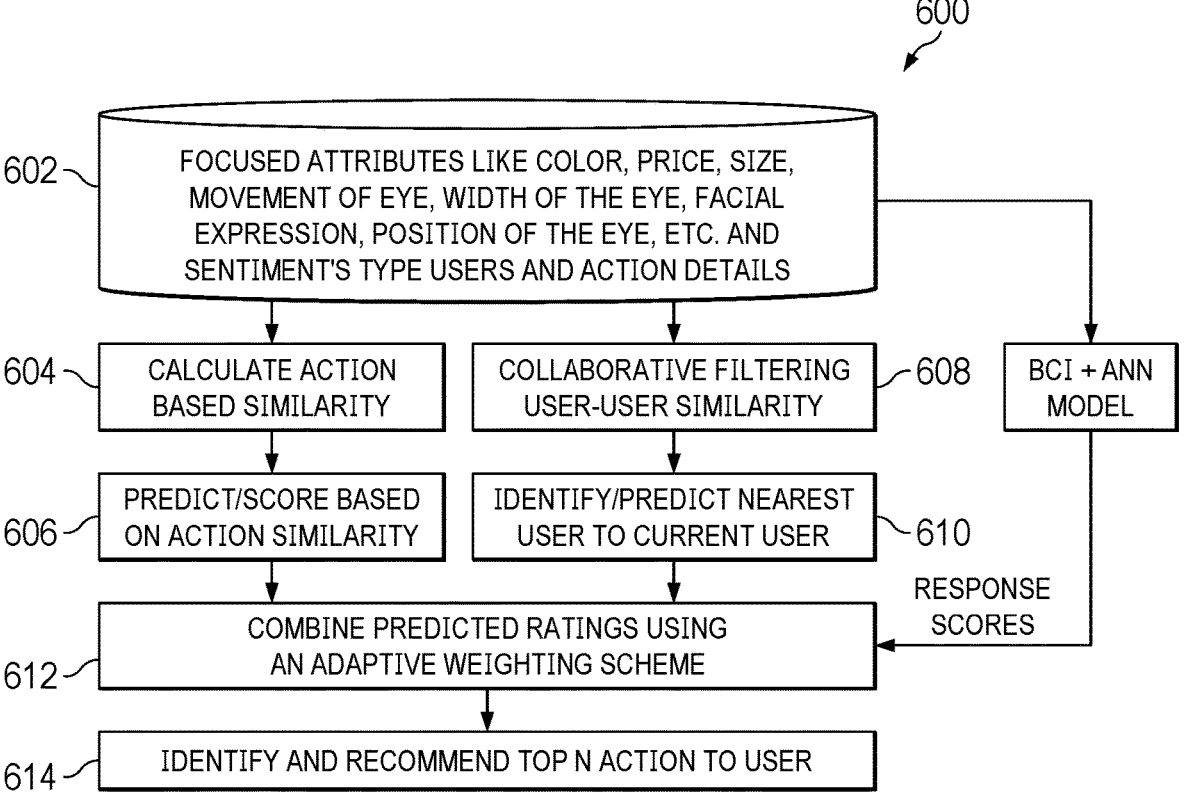

600

602 — FOCUSED ATTRIBUTES LIKE COLOR, PRICE, SIZE, MOVEMENT OF EYE, WIDTH OF THE EYE, FACIAL EXPRESSION, POSITION OF THE EYE, ETC. AND SENTIMENT'S TYPE USERS AND ACTION DETAILS

604 — CALCULATE ACTION BASED SIMILARITY

608 — COLLABORATIVE FILTERING USER-USER SIMILARITY

BCI + ANN MODEL

606 — PREDICT/SCORE BASED ON ACTION SIMILARITY

IDENTIFY/PREDICT NEAREST USER TO CURRENT USER — 610

612 — COMBINE PREDICTED RATINGS USING AN ADAPTIVE WEIGHTING SCHEME

RESPONSE SCORES

614 — IDENTIFY AND RECOMMEND TOP N ACTION TO USER

702 — MONITOR FOCUS PROMPT

704 — DETECT USER RESPONSE CORRESPONDING TO ATTRIBUTES

706 — PERFORM MULTIMODAL FUSION

708 — GENERATE ATTRIBUTES-BASED POSSIBLE RECOMMENDATION OR ACTION

710 — GENERATE ACTION PROMPT

712 — DISPLAY ACTION PROMPT

1000

DISPLAY PACK
BATCH FOR REVIEW

1002

GENERATE AND DISPLAY
GUIDANCE FOR REQUIRED
EQUIPMENT OR MATERIALS

1004

IDENTIFY PRODUCT
STORAGE AREAS

FROM FIG. 10B

B

DISPLAY GUIDANCE
ON PACKING, SEALING,
AND LABELING BOX

1016

DISPLAY GUIDANCE ON
DEPOSIT LOCATION

1018

UPDATE BATCH PACK TASK

1020

1100

DISPLAY PICK
BATCH FOR REVIEW

1102

GENERATE AND DISPLAY
GUIDANCE FOR REQUIRED
EQUIPMENT OR MATERIALS

1104

IDENTIFY PRODUCT
STORAGE AREAS

FROM FIG. 11B

B

SYSTEMS AND METHODS OF MULTIMODAL INTERACTION-BASED SUPPLY CHAIN EXECUTION USING IMMERSIVE GUIDANCE

CROSS-REFERENCE TO RELATED APPLICATIONS

The present disclosure is related to that disclosed in U.S. Provisional Application No. 63/534,261, filed Aug. 23, 2023, entitled "Systems and Methods of Multimodal Interaction-Based Task Performance Using Immersive Guidance," U.S. Provisional Application No. 63/527,742, filed Jul. 19, 2023, entitled "Systems and Methods of Multimodal Interaction-Based Omni-Channel Commerce Using Immersive Guidance," U.S. Provisional Application No. 63/527,740, filed Jul. 19, 2023, entitled "Systems and Methods of Multimodal Interaction-Based Supply Chain Planning Using Immersive Guidance," U.S. Provisional Application No. 63/527,736, filed Jul. 19, 2023, entitled "Systems and Methods of Multimodal Interaction-Based Supply Chain Execution Using Immersive Guidance," U.S. Provisional Application No. 63/458,325, filed Apr. 10, 2023, entitled "Systems and Methods of Multimodal Interaction-Based Supply Chain Execution," U.S. Provisional Application No. 63/445,163, filed Feb. 13, 2023, entitled "Systems and Methods of Multimodal Interaction-Based E-Commerce," U.S. Provisional Application No. 63/445,161, filed Feb. 13, 2023, entitled "Systems and Methods of Multimodal Interaction-Based Supply Chain Planning," and U.S. Provisional Application No. 63/445,154, filed Feb. 13, 2023, entitled "Systems and Methods of Multimodal Interaction-Based Interface." U.S. Provisional Application Nos. 63/534,261, 63/527,742, 63/527,740, 63/527,736, 63/458,325, 63/445, 163, 63/445,161, and 63/445,154 are assigned to the assignee of the present application. The present invention hereby claims priority under 35 U.S.C. § 119 (e) to U.S. Provisional Application Nos. 63/534,261, 63/527,742, 63/527,740, 63/527,736, 63/458,325, 63/445,163, 63/445, 161, and 63/445,154.

TECHNICAL FIELD

The present disclosure relates generally to immersive guidance and more specifically to immersive guidance for supply chain execution tasks.

BACKGROUND

When using a software application, users work with finite intents and encounter many micro-moments in which they need to act on or get the most out of the intents. Current interface systems face challenges from the gap between the context of use (emotions and the environment) of the user, the intentions of the user, and the various possibilities on which to act on the intentions within the context of use. Current software interfaces are limited to mostly mouse and keyboard inputs. Using these inputs, cognitive processing of the user is required to identify what actions may be performed, how to perform the actions, and which motor movements are needed to use these peripherals. These drawbacks encompass the majority of the time needed to convert an intent of the user into an action performed by the software application interface, which prevents a natural way to interact with computer systems, inhibits productivity to perform finite and repetitive multitasks, and limits accessibility for users with special challenges. In the example of warehouse execution system, use of existing systems may require excess physical and cognitive loads of users, may detract from task efficiency due to the amount of screen engagement required, and may result in efficiency losses due to lengthy and repetitive data entry tasks required of users, all of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIGS. 3A-3D illustrate example interfaces of the planning and execution system, in accordance with an embodiment;

FIG. 5 illustrates a method of multimodal blend modeling, in accordance with an embodiment;

FIG. 6 illustrates a method of action recommendation based on brain-computer interface signals, in accordance with an embodiment;

DETAILED DESCRIPTION

Figure 1:
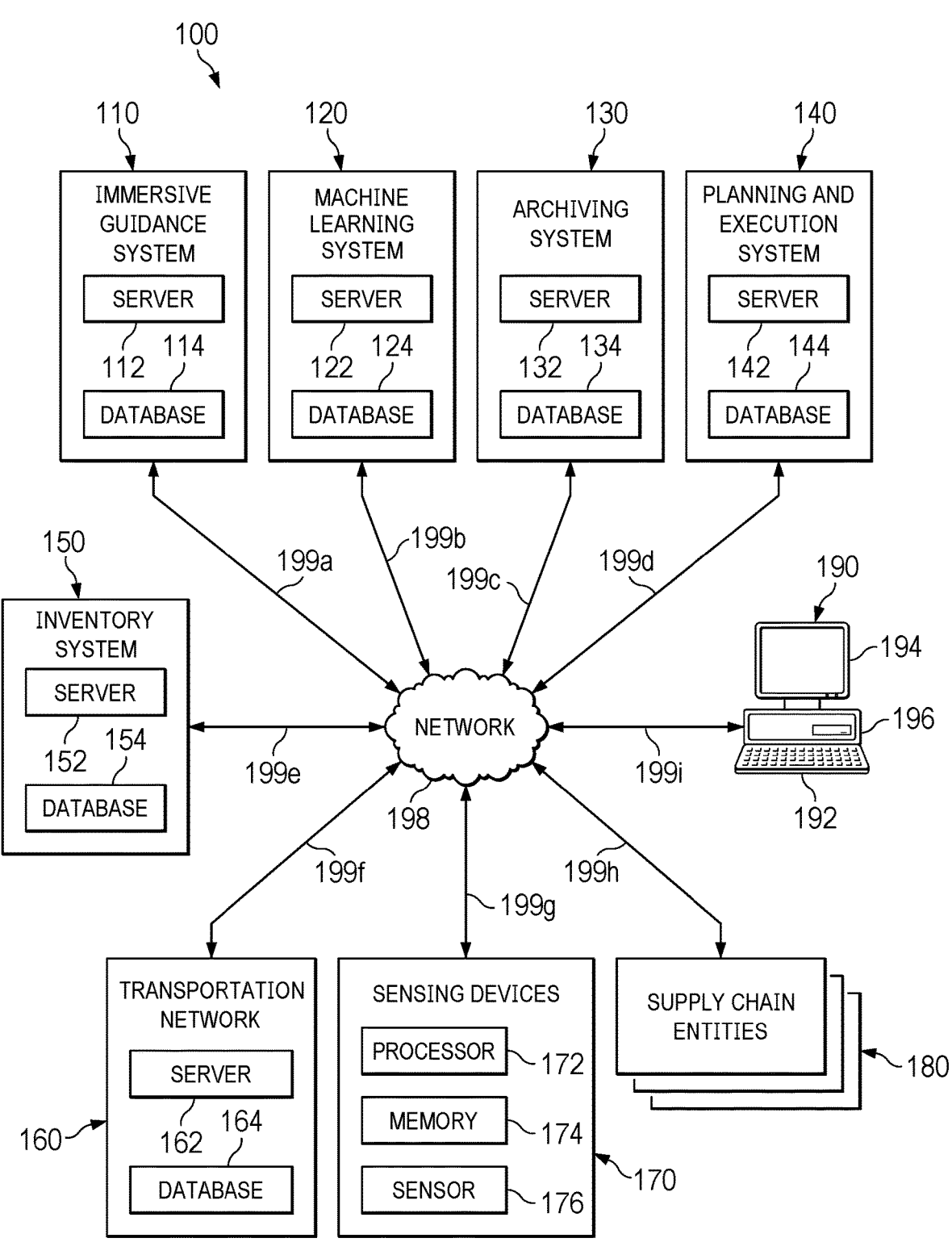
FIG. 1 illustrates a supply chain execution system, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide systems and methods of natural visual manipulation of interfaces using multimodal interactions. Embodiments may monitor intent-driven actions using multimodal interaction fusion of brain-computer interface (BCI) input, voice-user interface (VUI) input, facial expressions and gestures, eye movements, mouse, keyboard, and/or the like. Embodiments may use a machine learning model to recognize user intents in supply chain execution computer environments, assist users to perform application tasks and actions, and provide predicted actions and attribute-based recommendations for a supply chain execution system which may comprise, for example, a planning and execution system. Embodiments may use mixed or augmented reality (AR) displays to provide immersive guidance for users during supply chain tasks.

Embodiments of the following disclosure enable systems and methods to offer a unified user interface experience providing a more natural performance. Embodiments may enable users to navigate complex software more quickly and with less user input than existing user interface systems. Use of embodiments may improve the efficiency of supply chain execution tasks, such as by reducing the work required by users to read and enter data into data management systems associated with the supply chain. Use of embodiments may also increase the accuracy of supply chain execution tasks by reducing the cognitive load required to perform supply chain tasks.

FIG. 1 illustrates supply chain execution system 100, in accordance with a first embodiment. Supply chain execution system 100 comprises immersive guidance system 110, machine learning system 120, archiving system 130, planning and execution system 140, inventory system 150, transportation network 160, one or more sensing devices 170, one or more supply chain entities 180, one or more computers 190, network 198, and one or more communication links 199a-199i. Although a single immersive guidance system 110, a single machine learning system 120, a single archiving system 130, a single planning and execution system 140, a single inventory system 150, a single transportation network 160, one or more sensing devices 170, one or more supply chain entities 180, one or more computers 190, a single network 198, and one or more communication links 199a-199i are shown and described, embodiments contemplate any number of immersive guidance systems, machine learning systems, archiving systems, planning and execution systems, inventory systems, transportation networks, sensing devices, supply chain entities, computers, networks, or communication links, according to particular needs.

In one embodiment, immersive guidance system 110 comprises server 112 and database 114. As described in more detail below, embodiments of immersive guidance system 110 monitor any combination of one or more modes of user input, including, for example, a mouse, a keyboard, a touchscreen, a BCI, a VUI, eye movement and position, facial expressions, gestures, and the like, to monitor user interactions and behavior. Immersive guidance system 110 generates a fusion of multimodal inputs, such as, for example, BCI inputs, eye and facial movement, and behavioral data 220 (FIG. 2), to generate a response classifier that is used with a machine learning model to predict system actions and recommend items to provide assistive and adaptive supply chain execution such as, for example, warehouse task recommendations based on eye position, data manipulation, visual content filtering and approval, data segmentation, and attribute prediction. As described in further detail below, immersive guidance system 110 may generate a set of suggested actions based on the fusion input and map the suggested actions in real time using mixed reality guidance to guide users through operations involving physical interactions.

Machine learning system 120 of supply chain execution system 100 comprises server 122 and database 124. In embodiments, machine learning system 120 trains one or more machine learning models using continuous learning to adapt to user behaviors and preferences to manipulate content, render information, and perform actions for planning and execution system 140. Machine learning system 120 may use reinforcement learning to learn behavior from user interactions and adopt increasingly precise responses and feedback based on user interactions with supply chain execution system 100. Embodiments further contemplate using artificial intelligence (AI) to automatically improve the performed actions in a user interface (such as, for example, a graphical user interface (GUI)) of one or more enterprise applications. According to embodiments, the machine learning model may comprise an Artificial Neural Network (ANN) or any other suitable machine learning model, according to particular needs.

Archiving system 130 of supply chain execution system 100 comprises server 132 and database 134. Although archiving system 130 is shown as comprising a single server 132 and a single database 134, embodiments contemplate any suitable number of servers or databases internal to, or externally coupled with, archiving system 130. Server 132 of archiving system 130 may support one or more processes for receiving and storing data from immersive guidance system 110, machine learning system 120, planning and execution system 140, inventory system 150, transportation network 160, one or more sensing devices 170, one or more supply chain entities 180, and/or one or more computers 190 of supply chain execution system 100. According to some embodiments, archiving system 130 comprises an archive of data received from immersive guidance system 110, machine learning system 120, planning and execution system 140, inventory system 150, transportation network 160, one or more sensing devices 170, one or more supply chain entities 180, and/or one or more computers 190 of supply chain execution system 100, and archiving system 130 provides archived data to immersive guidance system 110, machine learning system 120, and planning and execution system 140, inventory system 150, transportation network 160 to, for example, train the machine learning model and generate predictions and recommendations, as described in further detail below. Server 132 may store the received data in database 134. Database 134 of archiving system 130 may comprise one or more databases or other data storage arrangement at one or more locations local to, or remote from, server 132.

According to an embodiment, planning and execution system 140 comprises server 142 and database 144. Supply chain planning and execution is typically performed by several distinct and dissimilar processes such as, for example, strategic assortment planning, demand planning, operations planning, production planning, supply planning, distribution planning, execution, pricing, forecasting, transportation management, warehouse management, inventory management, fulfillment, procurement, and the like. Server 142 of planning and execution system 140 comprises one or more modules, such as, for example, planning module 272, a solver, a modeler, and/or an engine, for performing actions of one or more planning and execution processes. Server 142 stores and retrieves data from database 144 or one or more locations in supply chain execution system 100. According to an embodiment comprising a planning system, server 142 comprises one or more modules to model, generate, and solve one or more supply chain planning problems. Continuing this example, server 142 of planning and execution system 140 may comprise one or more engines or solvers that generate a supply chain planning problem based on a model representing a supply chain network. In embodiments, the functions of planning and execution system 140 may be performed by a module within an operations management system, such as, for example, execution module 274. In further embodiments, planning and execution system 140 may be separate entity from the operations management system which, in addition to the functions and modules described above, may further comprise modules for warehouse execution, such as a warehouse management system (WMS), modules for transportation execution, such as a transportation management system (TMS), or any other module associated with a particular function or set of entities in supply chain execution system 100.

Inventory system 150 comprises server 152 and database 154. Server 152 of inventory system 150 is configured to receive and transmit item data, including item identifiers, pricing data, attribute data, inventory levels, and other like data about one or more items at one or more locations in supply chain execution system 100. Server 152 stores and retrieves item data from database 154 or from one or more locations in supply chain execution system 100. Inventory system 150 may send current inventory levels to planning and execution system 140 and, in response, planning and execution system 140 may determine and indicate whether the current inventory levels are sufficient to meet one or more possible orders of supply chain execution system 100.

Transportation network 160 comprises server 162 and database 164. According to embodiments, transportation network 160 directs one or more transportation vehicles to ship one or more items between one or more supply chain entities 180 based, at least in part, on a sales forecast, product and attribute identification, and/or recommended alternative attributes determined by immersive guidance system 110, the number of items currently in stock at one or more supply chain entities 180, the number of items currently in transit in transportation network 160, a forecasted demand, a supply chain disruption, and/or one or more other factors described herein. The transportation vehicles comprise, for example, any number of trucks, cars, vans, boats, airplanes, unmanned aerial vehicles (UAVs), cranes, robotic machinery, or the like. The transportation vehicles may comprise radio, satellite, or other communication that communicates location information (such as, for example, geographic coordinates, distance from a location, global positioning satellite (GPS) information, or the like) with machine learning system 120, planning and execution system 140, inventory system 150, transportation network 160, and/or one or more supply chain entities 180 to identify the location of the transportation vehicles and the location of any inventory or shipment located on the transportation vehicles.

According to embodiments, one or more sensing devices 170 comprise one or more processors 172, memory 174, and one or more sensors 176 and may include any suitable input device, output device, fixed or removable computer-readable storage media, or the like. As explained in more detail below, one or more sensing devices 170 comprise one or more imaging sensors (e.g., corneal tracking sensors, iris tracking sensors, facial action coding (FACS) cameras or sensors, and the like) brainwave sensors of a BCI, heartrate sensors, skin galvanic sensors, microphones, and the like. According to embodiments, one or more sensing devices 170 comprise (or are coupled with) a computer, a monitor, a workstation, a mobile device, and the like. One or more sensing devices 170 monitor eye movements and location, facial features and movements, gestures, voice, behavior, emotions, brain signals, and the like of a user to control a GUI and/or one or more applications of supply chain execution system 100. Additionally, one or more sensing devices 170 may identify users and items (or attributes of the users or items) near one or more sensors 176 and generate a mapping of the user or an item (and/or the detected attributes).

One or more sensing devices 170 may comprise a mobile handheld device such as, for example, a smartphone, a tablet computer, a wireless device, a networked electronic device, or the like. One or more sensors 176 of one or more sensing devices 170 may comprise an imaging sensor, such as a camera, scanner, electronic eye, photodiode, charged coupled device (CCD), or any other sensor that detects electromagnetic radiation. In addition, or as an alternative, one or more sensors 176 may comprise a radio receiver and/or transmitter configured to read an electronic tag, such as, for example, an RFID tag. According to some embodiments, the functions and methods described in connection with one or more sensing devices 170 may be emulated by one or more modules configured to perform the functions and methods as described.

In addition, embodiments of one or more sensing devices 170 may comprise a mobile handheld electronic device such as, for example, a smartphone, a tablet computer, a wireless communication device, and/or one or more networked electronic devices configured to image items using one or more sensors 176 and transmit product images to one or more databases. According to an embodiment, one or more sensing devices 170 analyze images of products received from one or more sensors 176 and identify attributes, attribute values, identifiers, or the like. Each item may be represented in supply chain execution system 100 by an identifier, including, for example, Stock-Keeping Unit (SKU), Universal Product Code (UPC), serial number, barcode, tag, RFID, or like objects that encode identifying information. One or more sensing devices 170 may generate a mapping of one or more items in supply chain execution system 100 by scanning an identifier or object associated with an item and identifying the item based, at least in part, on the scan. This may include, for example, a stationary scanner located at one or more supply chain entities 180 that scans items as the items pass near the scanner.

One or more supply chain entities 180 may represent one or more suppliers, manufacturers, distribution centers, and retailers, including one or more enterprises. One or more suppliers may be any suitable entity that offers to sell or otherwise provides one or more components to one or more manufacturers. One or more suppliers may, for example, receive a product from a first supply chain entity of one or more supply chain entities 180 in supply chain execution system 100 and provide the product to another supply chain entity of one or more supply chain entities 180. One or more suppliers may comprise automated distribution systems that automatically transport products to one or more manufacturers. A manufacturer may be any suitable entity that manufactures at least one product. A manufacturer may use one or more items during the manufacturing process to produce any manufactured, fabricated, assembled, or otherwise processed item, material, component, good, or product. Items may comprise, for example, components, materials, products, parts, supplies, or other items that may be used to produce products. In addition, or as an alternative, an item may comprise a supply or resource that is used to manufacture the item but does not become a part of the item. In one embodiment, a product represents an item ready to be supplied to, for example, another supply chain entity of one or more supply chain entities 180, such as a supplier, an item that needs further processing, or any other item. A manufacturer may, for example, produce and sell a product to a supplier, another manufacturer, a distribution center, a retailer, a customer, or any other suitable person or entity. Such manufacturers may comprise automated robotic production machinery that produces products based, at least in part, on the number of items currently in stock at one or more supply chain entities 180, the number of items currently in transit in transportation network 160, a forecasted demand, a supply chain disruption, a material or capacity reallocation, current and projected inventory levels at one or more stocking locations, and/or one or more additional factors described herein.

One or more distribution centers may be any suitable entity that offers to sell or otherwise distributes at least one product to one or more retailers and/or customers. Distribution centers may, for example, receive a product from a first supply chain entity of one or more supply chain entities 180 in supply chain execution system 100 and store and transport the product for a second supply chain entity of one or more supply chain entities 180. Such distribution centers may comprise automated warehousing systems that automatically transport to one or more retailers or customers and/or automatically remove an item from, or place an item into, inventory based, at least in part, on the number of items currently in stock at one or more supply chain entities 180, the number of items currently in transit in transportation network 160, a forecasted demand, a supply chain disruption, a material or capacity reallocation, current and projected inventory levels at one or more stocking locations, and/or one or more additional factors described herein. One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on the number of items currently in stock at one or more supply chain entities 180, the number of items currently in transit in transportation network 160, a forecasted demand, a supply chain disruption, a material or capacity reallocation, current and projected inventory levels at one or more stocking locations, and/or one or more additional factors described herein. Although one or more suppliers, manufacturers, distribution centers, and retailers are shown and described as separate and distinct entities, the same entity may simultaneously act as any one or more suppliers, manufacturers, distribution centers, and retailers. For example, one or more manufacturers acting as a manufacturer may produce a product, and the same entity may act as a supplier to supply a product to another supply chain entity of one or more supply chain entities 180. Although one example of supply chain execution system 100 is shown and described, embodiments contemplate any configuration of supply chain execution system 100, without departing from the scope of the present disclosure.

As shown in FIG. 1, supply chain execution system 100 operates on one or more computers 190 that are integral to or separate from the hardware and/or software that support immersive guidance system 110, machine learning system 120, archiving system 130, planning and execution system 140, inventory system 150, transportation network 160, one or more sensing devices 170, and one or more supply chain entities 180. One or more computers 190 may include any suitable input device 192, such as a keypad, mouse, touch screen, microphone, or other device to input information. Output device 194 may convey information associated with the operation of supply chain execution system 100, including digital or analog data, visual information, or audio information. One or more computers 190 may include fixed or removable computer-readable storage media, including a non-transitory computer readable medium, magnetic computer disks, flash drives, CD-ROM, in-memory device, or other suitable media to receive output from and provide input to supply chain execution system 100.

One or more computers 190 may include one or more processors 196 and associated memory to execute instructions and manipulate information according to the operation of supply chain execution system 100 and any of the methods described herein. In addition, or as an alternative, embodiments contemplate executing the instructions on one or more computers 190 that cause one or more computers 190 to perform functions of the methods. An apparatus implementing special purpose logic circuitry, for example, one or more field programmable gate arrays (FPGA) or application-specific integrated circuits (ASIC), may perform functions of the methods described herein. Further examples may also include articles of manufacture including tangible computer-readable media that have computer-readable instructions encoded thereon, and the instructions may comprise instructions to perform functions of the methods described herein.

In addition, and as discussed herein, supply chain execution system 100 may comprise a cloud-based computing system having processing and storage devices at one or more locations local to, or remote from, immersive guidance system 110, machine learning system 120, archiving system 130, planning and execution system 140, inventory system 150, transportation network 160, one or more sensing devices 170, and one or more supply chain entities 180. In addition, each of one or more computers 190 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with immersive guidance system 110, machine learning system 120, archiving system 130, planning and execution system 140, inventory system 150, transportation network 160, one or more sensing devices 170, and one or more supply chain entities 180. In addition, or as an alternative, these one or more users within supply chain execution system 100 may include, for example, one or more computers 190 programmed to autonomously handle, among other things, actions and/or one or more related tasks within supply chain execution system 100.

In one embodiment, immersive guidance system 110 may be coupled with network 198 using communication link 199a, which may be any wireline, wireless, or other link suitable to support data communications between immersive guidance system 110 and network 198 during operation of supply chain execution system 100. Machine learning system 120 may be coupled with network 198 using communication link 199b, which may be any wireline, wireless, or other link suitable to support data communications between machine learning system 120 and network 198 during operation of supply chain execution system 100. Archiving system 130 may be coupled with network 198 using communication link 199c, which may be any wireline, wireless, or other link suitable to support data communications between archiving system 130 and network 198 during operation of supply chain execution system 100. Planning and execution system 140 may be coupled with network 198 using communication link 199d, which may be any wireline, wireless, or other link suitable to support data communications between planning and execution system 140 and network 198 during operation of supply chain execution system 100. Inventory system 150 may be coupled with network 198 using communication link 199e, which may be any wireline, wireless, or other link suitable to support data communications between inventory system 150 and network 198 during operation of supply chain execution system 100. Transportation network 160 may be coupled with network 198 using communication link 199f, which may be any wireline, wireless, or other link suitable to support data communications between transportation network 160 and network 198 during operation of supply chain execution system 100. One or more sensing devices 170 may be coupled with network 198 using communication link 199g, which may be any wireline, wireless, or other link suitable to support data communications between one or more sensing devices 170 and network 198 during operation of supply chain execution system 100. One or more supply chain entities 180 may be coupled with network 198 using communication link 199h, which may be any wireline, wireless, or other link suitable to support data communications between one or more supply chain entities 180 and network 198 during operation of supply chain execution system 100. One or more computers 190 may be coupled with network 198 using communication link 199i, which may be any wireline, wireless, or other link suitable to support data communications between one or more computers 190 and network 198 during operation of supply chain execution system 100. Although communication links 199a-199i are shown as generally coupling immersive guidance system 110, machine learning system 120, archiving system 130, planning and execution system 140, inventory system 150, transportation network 160, one or more sensing devices 170, one or more supply chain entities 180, and one or more computers 190 to network 198, each of immersive guidance system 110, machine learning system 120, archiving system 130, planning and execution system 140, inventory system 150, transportation network 160, one or more sensing devices 170, one or more supply chain entities 180, and one or more computers 190 may communicate directly with each other, according to particular needs.

In another embodiment, network 198 includes the Internet and any appropriate local area networks (LANs), metropolitan area networks (MANs), or wide area networks (WANs) coupling immersive guidance system 110, machine learning system 120, archiving system 130, planning and execution system 140, inventory system 150, transportation network 160, one or more sensing devices 170, one or more supply chain entities 180, and one or more computers 190. For example, data may be maintained locally to, or externally of, immersive guidance system 110, machine learning system 120, archiving system 130, planning and execution system 140, inventory system 150, transportation network 160, one or more sensing devices 170, one or more supply chain entities 180, and one or more computers 190 and made available to one or more associated users of immersive guidance system 110, machine learning system 120, archiving system 130, planning and execution system 140, inventory system 150, transportation network 160, one or more sensing devices 170, one or more supply chain entities 180, and one or more computers 190 using network 198 or in any other appropriate manner. For example, data may be maintained in a cloud database at one or more locations external to immersive guidance system 110, machine learning system 120, archiving system 130, planning and execution system 140, inventory system 150, transportation network 160, one or more sensing devices 170, one or more supply chain entities 180, and one or more computers 190 and made available to one or more associated users of immersive guidance system 110, machine learning system 120, archiving system 130, planning and execution system 140, inventory system 150, transportation network 160, one or more sensing devices 170, one or more supply chain entities 180, and one or more computers 190 using the cloud or in any other appropriate manner. Those skilled in the art will recognize that the complete structure and operation of network 198 and other components within supply chain execution system 100 are not depicted or described. Embodiments may be employed in conjunction with known communications networks and other components.

In accordance with the principles of embodiments described herein, planning and execution system 140 may place product orders at various manufacturers and/or distribution centers and determine products to be carried at various retailers. Additionally, or in the alternative, planning and execution system 140 may generate a buy quantity for the inventory of one or more supply chain entities 180 in supply chain execution system 100. Furthermore, planning and execution system 140, inventory system 150, and/or transportation network 160 may instruct automated machinery (i.e., robotic warehouse systems, robotic inventory systems, automated guided vehicles, mobile racking units, automated robotic production machinery, robotic devices, and the like) to adjust product mix ratios, inventory levels at various stocking points, production of products of manufacturing equipment, proportional or alternative sourcing of one or more supply chain entities 180, and the configuration and quantity of packaging and shipping of products based, at least in part on, and in response to, orders and/or current inventory or production levels. For example, according to embodiments, planning and execution system 140 may order a purchase quantity for one or more products, which may be used in combination with inventory policies or target service levels to signify when the inventory quantity of an item reaches a particular level and that the item may need to be resupplied. Therefore, when the inventory of an item falls to a certain level, planning and execution system 140 may initiate one or more processes that automatically adjusts product mix ratios, inventory levels, production of products of manufacturing equipment, and proportional or alternative sourcing of one or more supply chain entities 180 until the inventory is resupplied to a target level.

The methods described herein may include one or more computers 190 receiving product data 282 from automated machinery having at least one sensor and product data 282 corresponding to an item detected by the automated machinery. Received product data 282 may include an image of the item, an identifier as described above, and/or other data associated with the item (dimensions, texture, estimated weight, and any other like data). The methods may further include one or more computers 190 looking up received product data 282 in a database system associated with planning and execution system 140, inventory system 150, and/or transportation network 160 to identify the item corresponding to product data 282 received from the automated machinery. Based on the identification of the item, one or more computers 190 may also identify (or alternatively generate) a first mapping in the database system, where the first mapping is associated with the current location of the identified item, and a second mapping in the database system, where the second mapping is associated with a past location of the identified item, and then compare the first mapping and the second mapping to determine whether the current location of the identified item in the first mapping is different than the past location of the identified item in the second mapping. One or more computers 190 may send instructions to the automated machinery based, at least in part, on one or more differences between the first mapping and the second mapping such as, for example, to locate items to add to or remove from an inventory of a shipment to fulfill one or more orders. In addition, or as an alternative, planning and execution system 140 may monitor one or more supply chain constraints of one or more items at one or more supply chain entities 180 and adjust the orders and/or inventory of one or more supply chain entities 180 at least partially based on one or more supply chain constraints.

Figure 2:
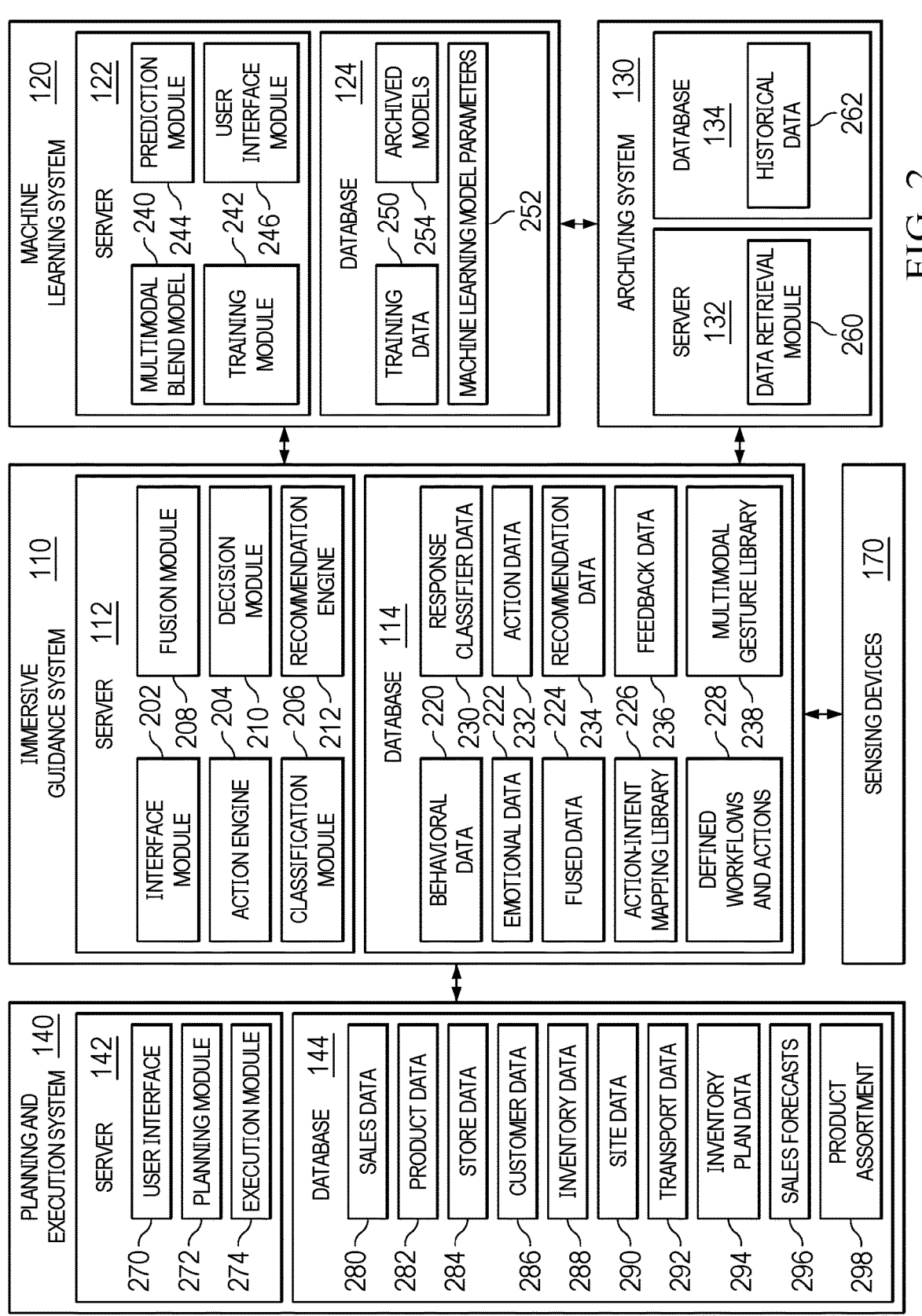
FIG. 2 illustrates the immersive guidance system, the machine learning system, the archiving system, the planning and execution system, and the one or more sensing devices of FIG. 1 in greater detail, in accordance with an embodiment.

FIG. 2 illustrates immersive guidance system 110, machine learning system 120, archiving system 130, planning and execution system 140, and one or more sensing devices 170 of FIG. 1 in greater detail, in accordance with an embodiment.

Immersive guidance system 110 comprises server 112 and database 114, as disclosed above. Although immersive guidance system 110 is shown as comprising a single server 112 and a single database 114, embodiments contemplate any suitable number of servers or databases internal to, or externally coupled with, immersive guidance system 110, according to particular needs. According to embodiments, server 112 comprises interface module 202, action engine 204, classification module 206, fusion module 208, decision module 210, and recommendation engine 212. Although server 112 is shown as comprising interface module 202, action engine 204, classification module 206, fusion module 208, decision module 210, and recommendation engine 212, embodiments contemplate any suitable number or combination of these located at one or more locations internal to, or externally coupled with, immersive guidance system 110, according to particular needs.

According to embodiments, interface module 202 comprises an input and sensor interface that monitors any combination of one or more modes of user interaction and input, including, for example, a mouse, a keyboard, a touchscreen, cursor, display device, voice commands, eye movement and position, facial features and movements, gestures, BCI, and the like, to monitor user actions, inputs, emotions, and behavior. Interface module 202 may further monitor the user environment (e.g., dashboard, list, detail, situation, CDT, and the like) and the user intent/motivation (e.g., decision, compare, drill in, filter, navigate, and the like). According to embodiments, user inputs and interactions may comprise focus prompts which monitor cursor position, eye cornea reflection tracking, active tab position, and the like. In addition, or as an alternative, the user input and interactions may comprise action prompts which may comprise BCI or emotional inputs which indicate mental state regulation (close to "HOLD"), movement imagery (close to "MOVE"), and evoked response generation (close to "CLICK"), as well as voice utterances, facial expression and sentiments, keyboard input, and the like.

Interface module 202 may be coupled with one or more sensing devices 170 and/or one or more input devices using one or more communication links, which may be any wireline, wireless, or other link suitable to support data communications between or among interface module 202 (and/or any input monitoring processing devices), one or more sensing devices 170, the one or more input devices, and network 198 during operation of supply chain execution system 100. For example, the input and sensor interface of interface module 202 may comprise an engine and/or processor that communicates over one or more communication links to send and receive data from one or more sensing devices 170 to monitor the eyes, face, head, hands, voice commands, brain signals, and the like of a user. The input and sensor interface may further communicate over one or more communication links to send and receive data associated with user inputs from one or more tactile input devices (e.g., mouse, keyboard, touchscreen, and the like). In addition, interface module 202 monitors actions (or inactions) taken by a user, as well as emotional data 222 and behavioral data 220 of the user, which is then compared with one or more possible or predicted actions that may be used to update one or more matrix tensors.

In embodiments, interface module 202 may generate and display mixed reality or augmented reality visual prompts based on one or more recommended actions. In such embodiments, interface module 202 may display the visual prompts on a mixed or augmented reality display of a user. For example, in a warehouse environment, when the one or more recommended actions includes a pick action for a particular item, interface module 202 may generate an augmented reality prompt highlighting or otherwise distinguishing a location where the item to be picked is stored, as well as display a quantity to be picked or a task completion progress. According to embodiments, interface module 202 may use geographic localization to generate the visual prompts and may perform vision-based object mapping between the visual prompts and tasks relevant to the one or more recommended actions. Interface module 202 may further capture actions performed by a user in real time to automatically update the visual prompts. In addition, interface module 202 may display information to the user in the visual prompts indicating whether a task has been correctly performed or incorrectly performed, and consequently display one or more corrective actions to remediate incorrectly performed actions.

According to embodiments, action engine 204 selects and displays one or more recommended actions corresponding to supply chain execution system 100 and may automatically initiate an action or task, as described in further detail below. Classification module 206 of immersive guidance system 110 classifies one or more possible actions or tasks based on a machine learning model, such as, for example, multimodal blend model 240, as described in further detail below. Fusion module 208 performs data fusion on behavioral data 220, emotional data 222, and/or other data received from interface module 202, as described in further detail below. In embodiments, decision module 210 generates statistical features or decision features from captured and extracted features. Decision module 210 may further formulate one or more matrix tensors to build a machine learning model, such as multimodal blend model 240.

Recommendation engine 212 generates a response score and attribute-based recommendations utilizing user interactions such as, for example, BCI and facial expressions. In embodiments, recommendation engine 212 may use the response score to propose actions or alternative recommendations for product attributes and decision-making processes, such as, for example, recommending a product or service in commerce, suggesting a substitute product or service, and other like integration of the user environment with response classifiers.

Database 114 of immersive guidance system 110 comprises one or more databases or other data storage arrangements at one or more locations local to, or remote from, immersive guidance system 110. Database 114 may comprise, for example, behavioral data 220, emotional data 222, fused data 224, action-intent mapping library 226, defined workflows and actions 228, response classifier data 230, action data 232, recommendation data 234, feedback data 236, and multimodal gesture library 238. Although database 114 is illustrated and described as comprising behavioral data 220, emotional data 222, fused data 224, action-intent mapping library 226, defined workflows and actions 228, response classifier data 230, action data 232, recommendation data 234, feedback data 236, and multimodal gesture library 238, embodiments contemplate any suitable number or combination of these located at one or more locations local to, or remote from, immersive guidance system 110, according to particular needs.

According to embodiments, behavioral data 220 of immersive guidance system 110 comprises various behaviors of a user corresponding to various interactions or activities of the user monitored by interface module 202. Emotional data 222 of immersive guidance system 110 comprises various emotions of a user corresponding to various interactions or activities of the user monitored by interface module 202. Fused data 224 of immersive guidance system 110 comprises a fusion of the user interaction and input signals from interface module 202. In one embodiment, fused data 224 comprises features from the different signals, which are then used by fusion module 208 to generate decision features. Action-intent mapping library 226 of immersive guidance system 110 is a repository for multimodal interaction, which is mapped and reinforced based on user interaction with supply chain execution system 100 to determine emotions, expressions, motions, tones, and the like.

Defined workflows and actions 228 of immersive guidance system 110 comprise one or more decision trees that describe the workflows, tasks, and actions based on a particular user environment, such as, for example, displayed information of an application of supply chain execution system 100, a displayed graphical element or product attribute being focused on by the user, and the like. Response classifier data 230 of immersive guidance system 110 predicts or classifies the response of a user based on a machine learning model. Action data 232 of immersive guidance system 110 comprises the output of the response classifier merged or combined with a social effect, as described in further detail below. According to embodiments, action engine 204 generates action data 232 comprising a suggested action for a user. Recommendation data 234 of immersive guidance system 110 comprises response scores, proposed actions, and/or recommendations corresponding to supply chain execution system 100 and decision-making processes. According to embodiments, feedback data 236 of immersive guidance system 110 comprises data received by interface module 202 during monitoring of the actions (or inactions) taken by a user of supply chain execution system 100, as well as emotional data 222 and behavioral data 220 of the user during presentation of the one or more possible or predicted actions.

Multimodal gesture library 238 of immersive guidance system 110 comprises an action repository for multimodal interaction which is mapped and reinforced based on user experience with supply chain execution system 100 over time. Multimodal gesture library 238 indicates how different signals are connected and the meanings of the signals and the connections, which is then used by a reinforcement learning model to generate predicted actions and recommendations.

One or more sensing devices 170 comprise one or more sensors 176 or input devices which may be used to collect and transmit user input to immersive guidance system 110. In embodiments, one or more sensing devices 170 may include sensors to track user inputs including voice input, BCI, facial expressions, eye movements, mouse movements, and/or keyboard inputs. Immersive guidance system 110 may use the input from one or more sensing devices 170 to determine the environment of a user of one or more sensing devices 170, such as a warehouse, a logistics center, a robotics center, a retail store, a transportation yard, or any other supply chain environment. According to embodiments, immersive guidance system 110 may use the input from one or more sensing devices 170 to determine an intent or motivation of the user, such as performing supply chain execution tasks including picking, pacing, staging, receiving, shipping, or any other supply chain execution tasks. Although supply chain execution tasks are used as an example for simplicity, immersive guidance system 110 may determine an intent to perform any task requiring physical interaction, including traditional supply chain tasks and other tasks, from the input of one or more sensing devices 170.

In embodiments, one or more sensors 176 may include a BCI. In such an embodiment, the BCI may provide an assistive and adaptive user interface to provide multitasking and efficient navigation and performing of actions without the use of any physical device such as keyboard and mouse, which may be especially useful for screens which require heavy visual interaction. In addition, or as an alternative, the BCI provides accessibility to applications for users with motor control disabilities. When coupled with supply chain execution system 100, the BCI provides attribute changes to displayed items, data manipulation (cut/copy, past, drag and drop, etc.), visual content filtering and approval, segmentation of data, and the like.

According to embodiments, one or more sensors 176 may include an eye tracking and facial recognition interface. In such an embodiment, the eye tracking and facial recognition interface may comprise an imaging sensor or camera that detects photons that are transformed by an imaging processor to generate a digital representation of an image. According to embodiments, the imaging sensor or camera may identify the location, position, and or movement of the face and eyes of the user to identify and/or predict expressions, moods, gaze, and the like. Eye tracking may provide for drilling down on products to view attributes, zooming into plans for better visibility, and automatic and/or lazy scrolling of display information. According to embodiments, by monitoring the gaze of the user through the eye movements and/or positions of the user, immersive guidance system 110 identifies an item in the gaze and may evoke that object to drill down into attributes, zoom in on a hierarchy for better visibility, and scroll through lists automatically when detecting that the gaze is near the last displayed object on the list. As disclosed above, fusion module 208 of immersive guidance system 110 extracts features from the eye movement and facial expressions comprising geometrical and textual features, as well as saccade frequencies, dispersions, amplitude of the movement, blink frequency of eyes, fixation frequency of eyes, and the like, which may be used to determine facial expressions, mood, emotions, focus, and the like. In addition, embodiments contemplate using facial recognition to automatically recognize users, and mapping or tagging monitored interface data, behavioral data 220, and emotional data 222 with particular users.

Machine learning system 120 comprises server 122 and database 124, as disclosed above. Although machine learning system 120 is shown as comprising a single server 122 and a single database 124, embodiments contemplate any suitable number of servers or databases internal to, or externally coupled with, machine learning system 120.

Server 122 of machine learning system 120 comprises multimodal blend model 240, training module 242, prediction module 244, and user interface module 246. Although server 122 is shown and described as comprising a single multimodal blend model 240, a single training module 242, a single prediction module 244, and a single user interface module 246, embodiments contemplate any suitable number or combination of these located at one or more locations local to, or remote from, machine learning system 120, such as on multiple servers or computers 190 at one or more locations in supply chain execution system 100.

Database 124 of machine learning system 120 may comprise one or more databases or other data storage arrangement at one or more locations local to, or remote from, server 122. Database 124 of machine learning system 120 comprises, for example, training data 250, machine learning model parameters 252, and archived models 254. Although database 124 of machine learning system 120 is shown and described as comprising training data 250, machine learning model parameters 252, and archived models 254, embodiments contemplate any suitable number or combination of data located at one or more locations local to, or remote from, machine learning system 120, according to particular needs.

According to embodiments, multimodal blend model 240 comprises a machine learning model trained by training module 242 to perform multimodal blending of a variety of input sources. As described in further detail below, multimodal blend model 240 may combine various input features, including low-level and high-level input features, to generate fused input data, which may then be used by immersive guidance system 110 to generate one or more recommended actions to suggest to a user based on the input provided to multimodal blend model 240. Training module 242 receives instances of training data 250 and trains multimodal blend model 240 using, for example, a reinforcement training model. According to this embodiment, training module 242 trains multimodal blend model 240 to determine a user intent and generate predictions and recommendations. Various machine learning models may be used, such as for example, an Artificial Neural Network (ANN) trained using deep learning.

Prediction module 244 of machine learning system 120 generates predictions comprising the response classifiers from one or more machine learning models. User interface module 246 of machine learning system 120 generates and displays a GUI having one or more interactive visualizations for training the machine learning model and selecting one or more machine learning techniques to learn machine learning model parameters 252. According to embodiments, user interface module 246 displays a GUI comprising interactive graphical elements for selecting and modifying training data 250, machine learning model parameters 252, archived models 254, and the like.

Training data 250 comprises data used by training module 242 to perform reinforcement training on multimodal blend model 240. For example, training data 250 may comprise user responses to suggested actions detected by interface module 202 of immersive guidance system 110. Machine learning model parameters 252 comprise weights, connections, hierarchies, selected number of layers, or any other machine learning model parameter. Archived models 254 comprise previously-trained machine learning models, which may be retrieved by immersive guidance system 110 to generate predictions and recommendations.

As disclosed above, archiving system 130 comprises server 132 and database 134. Although archiving system 130 is shown as comprising a single server 132 and a single database 134, embodiments contemplate any suitable number of servers or databases internal to, or externally coupled with, archiving system 130.

Server 132 of archiving system 130 comprises data retrieval module 260. Although server 132 is shown and described as comprising a single data retrieval module 260, embodiments contemplate any suitable number or combination of data retrieval modules located at one or more locations local to, or remote from, archiving system 130, such as on multiple servers or computers 190 at one or more locations in supply chain execution system 100.

In one embodiment, data retrieval module 260 of archiving system 130 receives historical data 262 from immersive guidance system 110, planning and execution system 140, inventory system 150, transportation network 160, and/or the one or more sensing devices 170 and stores received historical data 262 in database 134. According to one embodiment, data retrieval module 260 may prepare historical data 262 for use by machine learning system 120 by checking historical data 262 for errors and transforming historical data 262 to normalize, aggregate, and/or rescale historical data 262 to allow direct comparison of other data received from immersive guidance system 110, planning and execution system 140, inventory system 150, transportation network 160, and/or one or more sensing devices 170. According to embodiments, data retrieval module 260 receives data from one or more sources external to supply chain execution system 100, such as, for example, user profiles, weather data, social media data, user and event calendars, and the like, and stores the received data as historical data 262.

Database 134 of archiving system 130 may comprise one or more databases or other data storage arrangement at one or more locations local to, or remote from, server 132. Database 134 of archiving system 130 comprises, for example, historical data 262. Although database 134 of archiving system 130 is shown and described as comprising historical data 262, embodiments contemplate any suitable number or combination of data located at one or more locations local to, or remote from, archiving system 130, according to particular needs.

Historical data 262 comprises data received from immersive guidance system 110, planning and execution system

140, inventory system 150, transportation network 160, one or more sensing devices 170, one or more computers 190, and/or one or more locations local to, or remote from, supply chain execution system 100, such as, for example, one or more sources for user profiles, special events, social media, calendars, and the like. In an embodiment, historical data 262 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, a week of the month, a week of the year, a month of the year, special events, paydays, and the like.

Planning and execution system 140 comprises server 142 and database 144, as disclosed above. Although planning and execution system 140 is shown as comprising a single server 142 and a single database 144, embodiments contemplate any suitable number of servers or databases internal to, or externally coupled with, planning and execution system 140. According to one embodiment, server 142 comprises user interface 270, planning module 272, and execution module 274. Although server 142 is shown and described as comprising a single user interface 270, a single planning module 272, and a single execution module 274, embodiments contemplate any suitable number or combination of these located at one or more locations local to, or remote from, planning and execution system 140, such as one or more servers or computers 190 at one or more other locations in supply chain execution system 100.

Database 144 of planning and execution system 140 may comprise one or more databases or other data storage arrangements at one or more locations local to, or remote from, server 142. Database 144 comprises, for example, sales data 280, product data 282, store data 284, customer data 286, inventory data 288, site data 290, transport data 292, inventory plan data 294, sales forecasts 296, and product assortment 298. Although, database 144 is shown and described as comprising sales data 280, product data 282, store data 284, customer data 286, inventory data 288, site data 290, transport data 292, inventory plan data 294, sales forecasts 296, and product assortment 298, embodiments contemplate any suitable number or combination of these located at one or more locations local to, or remote from, planning and execution system 140, according to particular needs.

User interface 270 provides interactive graphical elements comprising selectable elements that, in response to a user selection, initiate a predetermined action, such as, for example, a task of one or more workflows of supply chain execution system 100. In the example of planning and execution system 140 comprising a warehouse management system, user interface 270 may display details of warehouse tasks to be performed (such as various picking tasks, packing tasks, or any other task that may be performed in a warehouse, as described in further detail below), warehouse data, workforce or employee data, work or task schedules, equipment data, equipment usage schedules, process data, work-in-progress data, or any other data that may be related to the operation of a warehouse or other inventory-storage entity of supply chain execution system 100. In the example of planning and execution system 140 comprising an assortment planner, user interface 270 may automatically display data, graphs, scores, product images, product attributes, attribute values, selectable time periods, and placeholders for a product assortment based on the season and the one or more products being planned by the assortment planner.

Planning module 272 plans supply chain tasks and operations, such as creating supply chain plans, inventory plans, labor management plans, or any other supply chain operation or set of operations that may be planned. In the example of planning and execution system 140 comprising a warehouse management system, planning module 272 may comprise a warehouse planning module that may schedule warehouse tasks, such as delivery, logistics, and fulfillment tasks. In the example of planning and execution system 140 comprising an assortment planner, planning module 272 may comprise a product selection module that provides for configuring images and associated product data 282 of historical products, product placeholders, or products planned for an upcoming planning assortment in a retail location. According to embodiments, in addition to the product attributes and attribute values, the assortment planner uses multimodal blend model 240, received from machine learning system 120, to select the one or more products for a future planning assortment. Although particular examples of planning module 272 are shown and described, embodiments contemplate other suitable planning modules for any planning and execution system 140, according to particular needs.

Figure 3A:
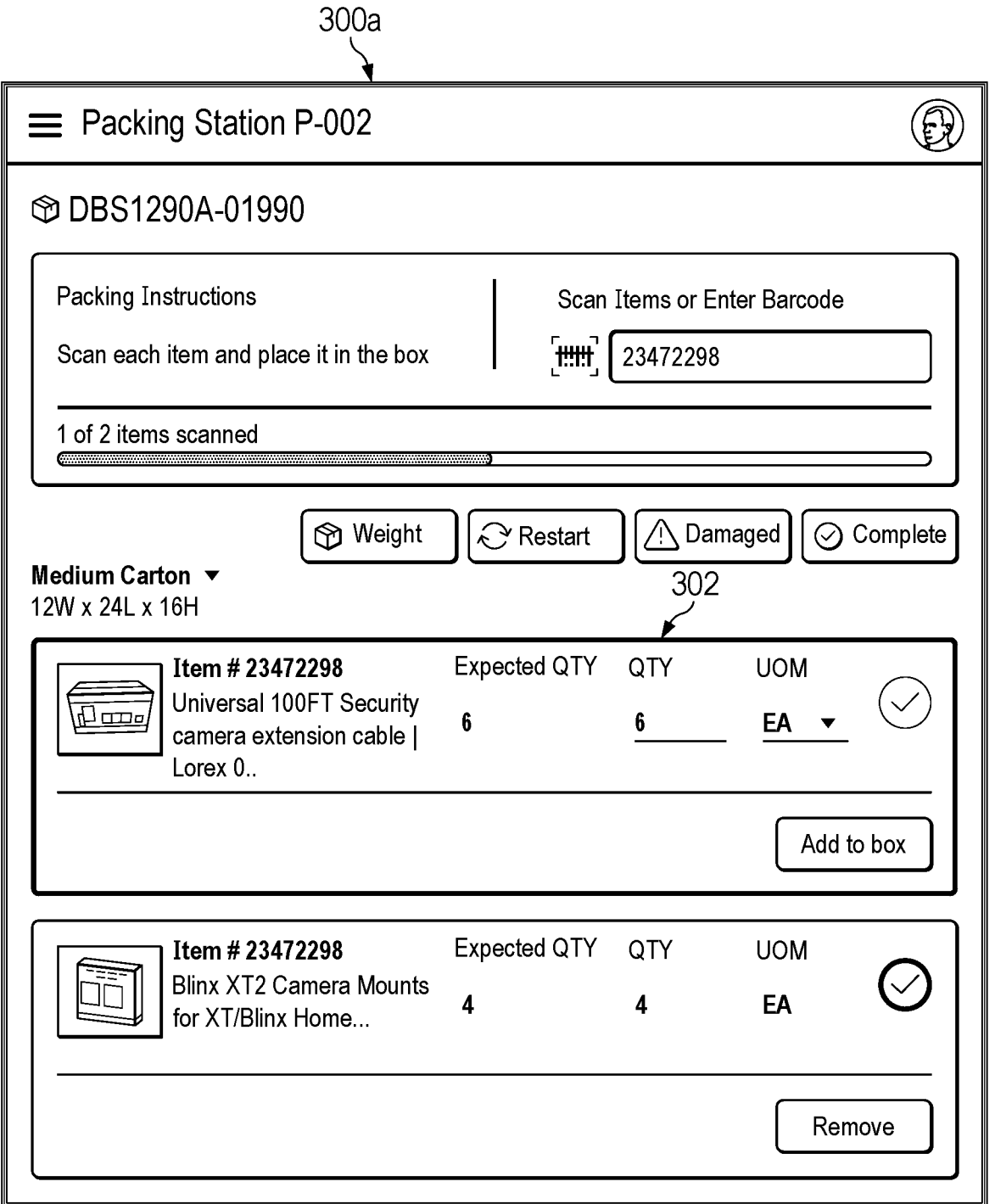

Execution module 274 may provide a supply chain execution interface such as, for example, a warehouse management system for packing (See FIG. 3A), visual drill-in for warehouse tasking (See FIG. 3B), visual filtering for warehouse execution (See FIG. 3C), and visual filtering for employee self-service (ESS) (See FIG. 3D). Although particular examples of execution modules are shown and described, embodiments contemplate other suitable execution modules for any planning and execution system 140, according to particular needs.

Sales data 280 of database 144 may comprise recorded sales and returns transactions and related data, including, for example, a transaction identification, time and date stamp, channel identification such as stores or online touch-points, product identification, actual cost, selling price, sales quantity, customer identification, promotions, and/or the like. In addition, sales data 280 may be represented by any suitable combination of values and dimensions, aggregated or un-aggregated, such as, for example, sales per week, sales per week per location, sales per day, sales per day per season, or the like.

Product data 282 of database 144 may comprise one or more data structures comprising products identified by, for example, a product identifier (such as a Stock Keeping Unit (SKU), Universal Product Code (UPC), or the like) and one or more attributes and attribute types associated with the product ID. Product data 282 may comprise any attributes of one or more products organized according to any suitable database structure, and sorted by, for example, attribute type, attribute, value, product identification, or any suitable categorization or dimension. Attributes of one or more items may be, for example, any categorical characteristic or quality of an item, and an attribute value may be a specific value or identity for the one or more items according to the categorical characteristic or quality. According to other embodiments, the product data 282 considers shelf-life of perishable goods (which may range from days (e.g., fresh fish or meat) to weeks (e.g., butter) or even months, before any unsold items have to be written off as waste) as well as influences from promotions, price changes, rebates, coupons, and even cannibalization effects among products.

Store data 284 of database 144 may comprise data describing the stores of the one or more retailers and related store information. Store data 284 may comprise, for example, a store ID, store description, store location details, store location climate, store type, store opening date, lifestyle, store area (expressed in, for example, square feet, square meters, or other suitable measurement), latitude, longitude, and other like data. Store data 284 may include the identity and location of one or more stores grouped by store profiles into one or more store clusters. According to embodiments, store profiles comprise the identity of one or more store clusters which may be used to allocate products targeted to the customer preferences associated with the one or more stores.

Customer data 286 may comprise customer identity information, including, for example, customer relationship management data, loyalty programs, and mappings between product purchases and one or more customers so that the customer associated with a sale may be analyzed. Customer data 286 may include one or more customer preferences segments grouped according to one or more customer profiles comprising characteristics, such as goals, motivations, or preferences. Each customer profile may also be identified by assigning a name and image to the segment. The customer profiles may be used to analyze, sort, and understand supply chain data and generate product assortments.

Inventory data 288 of database 144 may comprise any data relating to current or projected inventory quantities or states, order rules, or the like. For example, inventory data 288 may comprise the current level of inventory for each item at one or more stocking points at one or more retailers, one or more distribution centers, or any other supply chain entity of one or more supply chain entities 180 across supply chain execution system 100. In addition, inventory data 288 may comprise order rules that describe one or more rules or limits on setting an inventory policy, including, but not limited to, a minimum order quantity, a maximum order quantity, a discount, and a step-size order quantity, and batch quantity rules. According to some embodiments, planning and execution system 140 accesses and stores inventory data 288 in database 144 of planning and execution system 140 and/or database 154 of inventory system 150, which may be used by planning and execution system 140 to place orders, set inventory levels at one or more stocking points, initiate manufacturing of one or more components, or the like. In addition, or as an alternative, inventory data 288 may be updated by receiving current item quantities, mappings, or locations from inventory system 150 and/or transportation network 160. According to one embodiment, inventory data 288 includes inventory policies. Inventory policies may, for example, describe the reorder point and target quantity, or other inventory policy parameters that set rules for planning and execution system 140, inventory system 150, and transportation network 160 to manage and reorder inventory. These inventory policies may be based on target service level, demand, cost, fill rate, or the like. Planning and execution system 140 may determine inventory policies that comprise target service levels that ensure that a service level of one or more stores of one or more retailers is met with a certain probability. For example, one or more retailers and/or one or more distribution centers may set a service level at 95%, meaning the one or more retailers and/or the one or more distribution centers sets the desired inventory stock level at a level that meets demand of the one or more stores 95% of the time. Although, a particular service level target and percentage is described, embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level.

In an embodiment, site data 290 comprises data related to inventory storage sites within supply chain execution system 100, which may be a fulfillment center, a warehouse, a distribution center, a micro fulfillment center (MFC), a retailer, or any other location where inventory is stored. As discussed in further detail below, site data 290 may include active promotions for the inventory storage sites and a product catalog associated with the inventory storage sites defining items available at the inventory storage sites and attributes of the items such as sizes, volumes weights or other attributes of items, a schedule of the inventory storage sites, or any other data related to the inventory storage sites. Site data 290 may also comprise storage location details such as available shelf space or other inventory storage attributes, as well as constraints of the storage location, such as available refrigeration space or other constraints on inventory storage.

Transport data 292 comprises data related to the transportation of items within supply chain execution system 100, including transportation schedules, costs associated with transporting one or more items, data relating to one or more transportation vehicles, weather data impacting transportation schedules, or any other data relating to transportation of items or transportation constraints. In embodiments, transport data 292 may be used by planning module 272 to generate inventory plans for inventory storage sites.

Inventory plan data 294 comprises inventory plans for the inventory storage sites generated by planning module 272. Planning module 272 may determine what inventory to stock at the inventory storage sites for a particular time period, and generate an inventory plan comprising delivery, stocking, and any other actions that would be required to stock the inventory at the supply chain site. In embodiments, planning and execution system 140 may automatically implement the inventory plan using one or more pieces of automated machinery.

According to embodiments, planning and execution system 140 generates one or more sales forecasts 296 for one or more products. By way of example only and not by way of limitation, planning and execution system 140 receives a request to generate an assortment that includes a new item (i.e., an item which has not previously been sold and, consequently, lacks any historical sales data). Planning module 272 may locate like-items matching the new item and calculate one or more sales forecasts 296 based on the historical sales data of the like-items. One or more sales forecasts 296 for the one or more new products is then compared with scoring bands for all products in the category of the new product. Planning module 272 may calculate the score for many new or proposed products for the assortment and select the highest-scoring products for inclusion in product assortment 298.

Figure 3B:
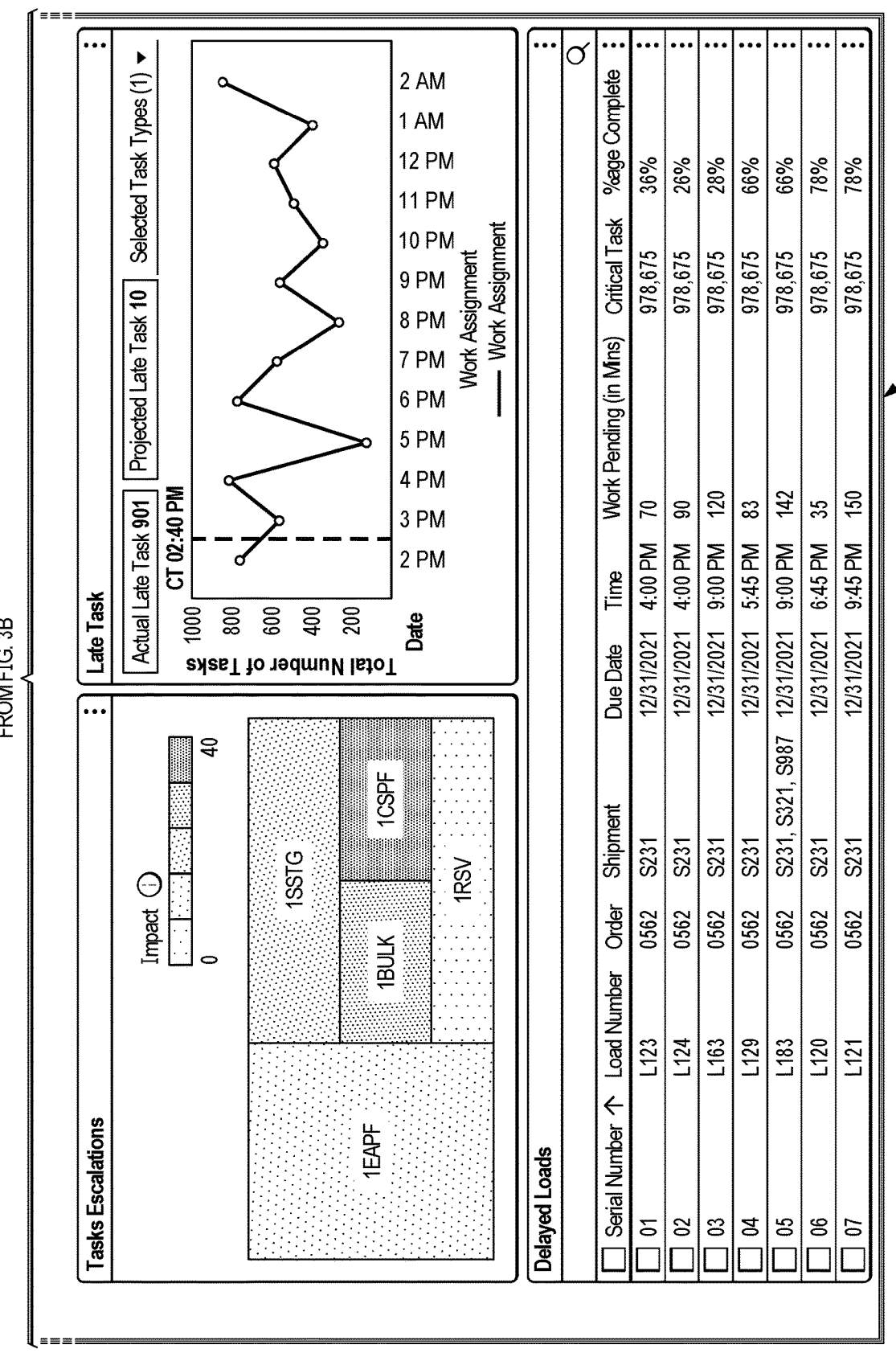

FIGS. 3A-3D illustrate example interfaces 300a-300d of planning and execution system 140, in accordance with an embodiment. Example interfaces 300a-300d correspond to GUIs displayed by user interface 270 that show content from one or more applications of planning and execution system 140. By way of example only and not by way of limitation, planning and execution system 140 may provide platforms for executing various supply chain tasks, such as warehouse management tasks, warehouse execution tasks, and employee self-service tasks. In the example of FIG. 3A, example interface 300a may provide a warehouse management system enabling a user to perform packing and picking tasks. As described in greater detail below, immersive guidance system 110 may detect the focus of the user on a graphical element corresponding to focus indicator 302 of example interface 300a of FIG. 3A and enable the user to drill into details of the items associated with the graphical element corresponding to focus indicator 302. In the example of FIG. 3B, example interface 300b may provide a warehouse tasking interface enabling a user, such as a warehouse manager, to assign tasks to employees. As described in greater detail below, immersive guidance system 110 may detect the focus of the user within example interface 300b of FIG. 3B and enable the user to drill into details of the focus area.

Figure 3C:
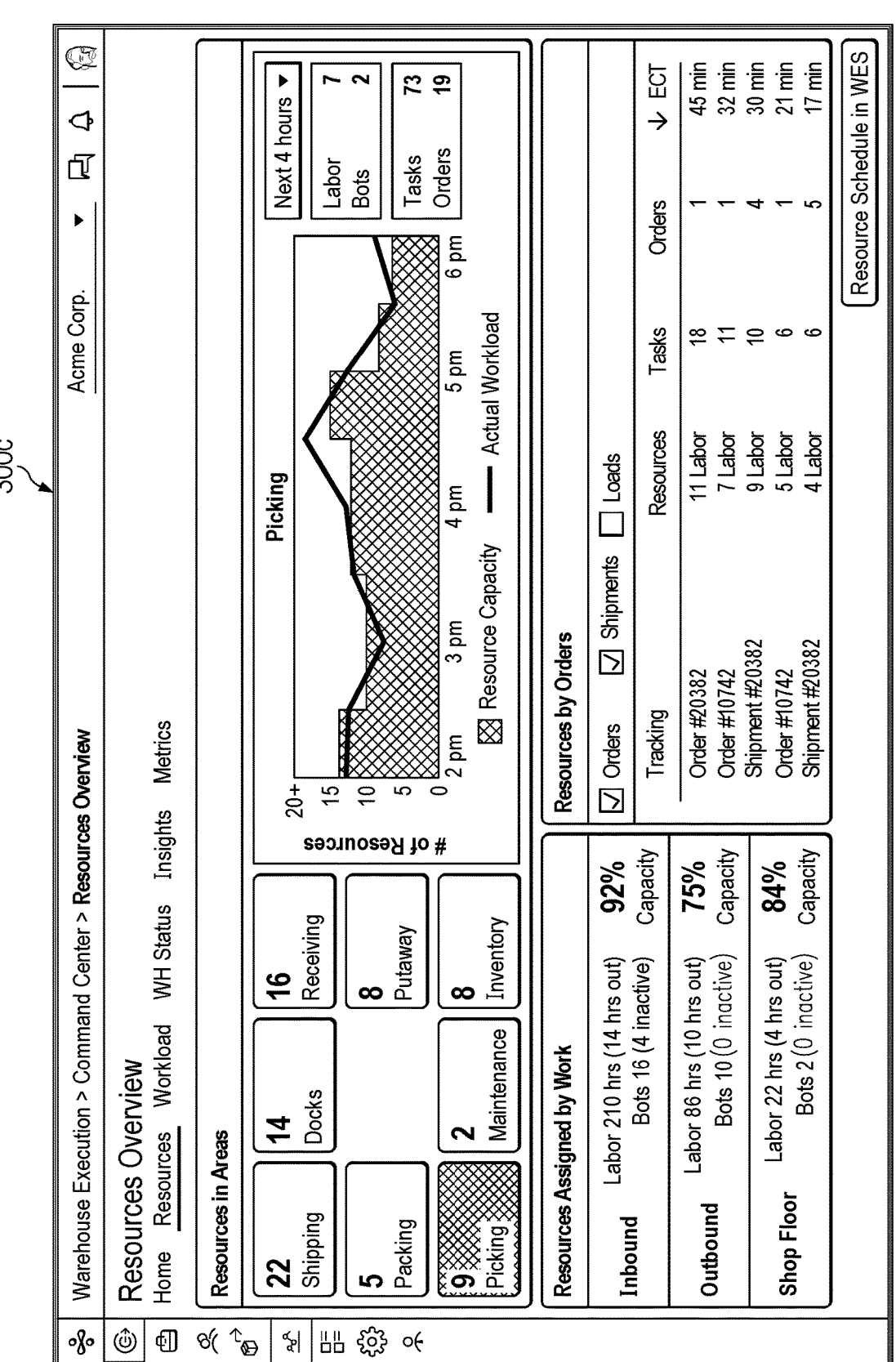
Figure 3D:
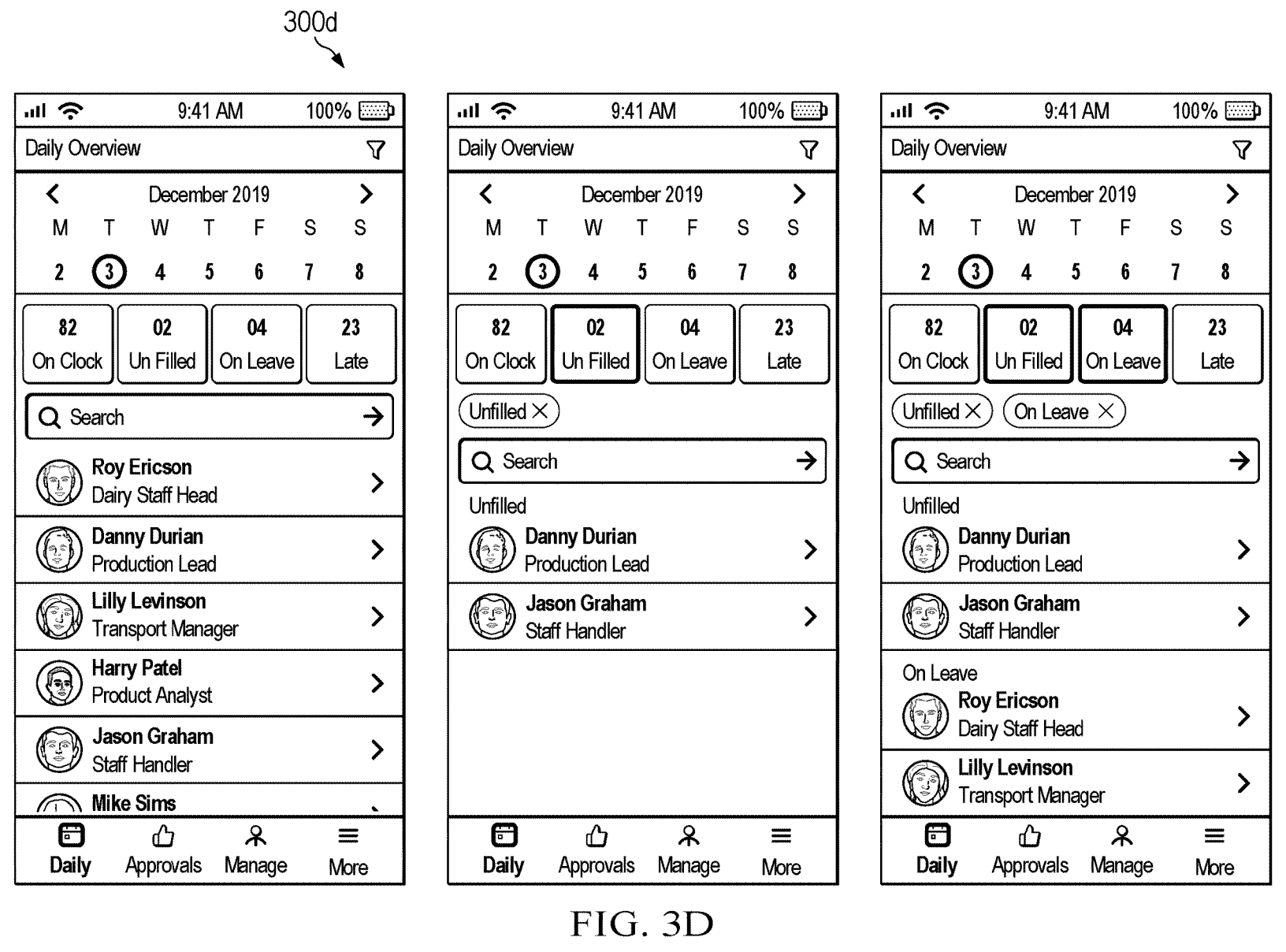

In the example of FIG. 3C, example interface 300c may provide a warehouse execution system enabling a user to view warehouse execution tasks alongside robotics or other resources of the warehouse. The warehouse execution system may also enable the user to determine how warehouse resources, including employees and machines, are performing, alongside inbound and outbound information. As described in greater detail below, and because of the amount of information associated with the warehouse execution system, immersive guidance system 110 may enable the user to perform visual filtering to include only information relevant to the user at a particular time. In the example of FIG. 3D, example interface 300d may provide an employee self-service interface. As described in greater detail below, immersive guidance system 110 may enable a user of the employee self-service interface to perform visual filtering to include only information relevant to the user at a particular time.

According to embodiments, the one or more applications may include data navigation and editing (e.g., decision trees, networks, workflows, databases, etc.), image editing or selection (e.g., photo editing, illustration, publishing, image selection, etc.), mapping (e.g., directions, GPI, etc.), e-commerce (shopping, product selection, etc.), and the like.

Figure 4:
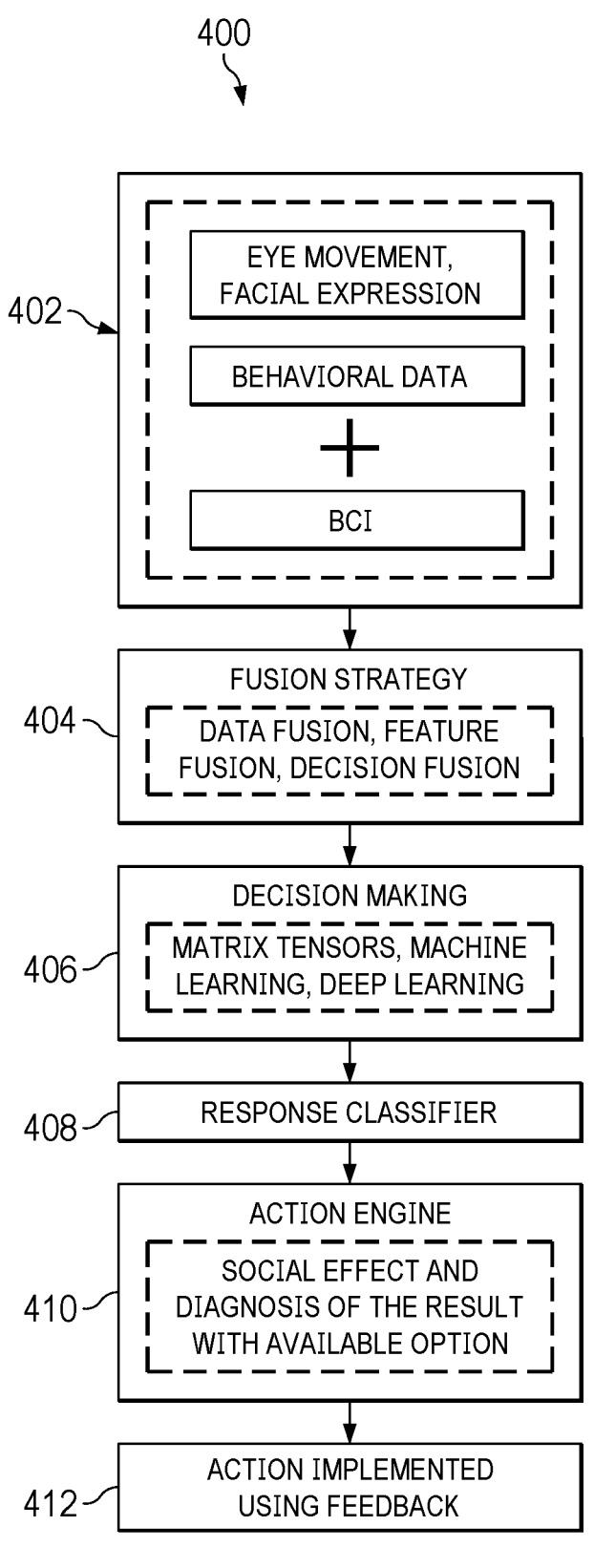
FIG. 4 illustrates a method of multimodal fusion, in accordance with an embodiment.

FIG. 4 illustrates method 400 of multimodal fusion, in accordance with an embodiment. Method 400 may be performed by an immersive guidance system, such as immersive guidance system 110 of FIG. 1. Method 400 comprises one or more activities, which although described in a particular order, may be performed in one or more permutations, according to particular needs. Method 400 of multimodal fusion identifies a next set of actions that a user is expected to perform, such as, for example, by identifying whether a user is focusing on a particular part of an execution GUI. As discussed herein, the identification of the user response may comprise a fusion of BCI input and facial feature detection to indicate the emotional state of the user, as well as determining the intent of the user by analyzing the gaze or cursor using machine learning to predict or recommend an action or item based on the response of the user.

At activity 402, interface module 202 of immersive guidance system 110 receives user interaction and input data. According to embodiments, the user interaction and input signals may comprise, for example, VUI, BCI, facial expressions, eye movements, mouse and keyboard input, and/or behavioral data 220. By way of example only and not by way of limitation, the illustrated embodiment captures eye movement (which provides, among other things, statistical features, as described in further detail below) and facial expressions, as well as behavior data 220 and BCI signals. At activity 404, fusion module 208 of immersive guidance system 110 fuses the user interaction and input signals from interface module 202. According to an embodiment, fusion module 208 fuses the eye movement and facial expression data with the BCI signals and behavioral data 220 to generate fused data 224. Fused data 224 comprises features from the different signals, which are then used by fusion module 208 to generate decision features. Using the fusion of BCI signals, screen gaze, and emotional sentiments, immersive guidance system 110 may initiate dynamic data changes or actions. As disclosed in further detail below, immersive guidance system 110 may generate a response score, which, in some embodiments, is combined with user environmental variables received from the combinations of BCI and facial expressions and used to generate attribute-based recommendations.

At activity 406, decision module 210 of immersive guidance system 110 uses the decision features to create one or more matrix tensors. According to embodiments, machine learning system 120 uses the one or more matrix tensors along with machine learning and/or deep learning to build a machine learning model, such as, for example, multimodal blend model 240, as disclosed above. At activity 408, classification module 206 of immersive guidance system 110 generates a response classifier. According to an embodiment, classification module 206 uses the machine learning model to generate the response classifier, which predicts or classifies the response of a user.

At activity 410, decision module 210 passes the response classifier to action engine 204 of immersive guidance system 110 where action engine 204 merges or combines the response classifier with a social effect. According to embodiments, the social effect is the diagnosis of previous results in a similar context, such as, for example, historical data 262 and/or multimodal gesture library 238. For example, when the user has a positive response (the response classifier) upon viewing a graphical element on a GUI of a particular application, at activity 410, action engine 204 may associate that when the user has previously had a positive response upon viewing a similar graphical element on a GUI of the same application, the user has drilled down on the graphical element to view attributes associated with the graphical element (the social effect).

At activity 412, action engine 204 uses the response from the social effect (the diagnosis of previous results in a similar context) and the diagnosis of the current result to generate one or more actions to suggest to the user. Continuing with the previous example, at activity 412, action engine 204 may suggest drilling down on the graphical element that evokes the positive response from the user to view attributes associated with the graphical element. After activity 412, embodiments contemplate that multimodal blend model 240 may learn and adapt to behavior and preferences of the user using reinforcement training via training module 242.

FIG. 5 illustrates method 500 of multimodal blend modeling, in accordance with an embodiment. Method 500 may be performed by an immersive guidance system, such as immersive guidance system 110 of FIG. 1. Method 500 comprises one or more activities, which although described in a particular order may be performed in one or more permutations, according to particular needs.

At activity 502, interface module 202 of immersive guidance system 110 monitors eye movement and facial expression of a user. In embodiments, interface module 202 may monitor eye movement and facial expression with one or more sensors 176 using image-based techniques, such as example-based learning. Interface module 202 may use feature analysis, active shape models, and the like to capture low level features from the eye movement and facial expression. At activity 504, fusion module 208 of immersive guidance system 110 extracts and fuses features captured at activity 502. For example, fusion module 208 extracts geometrical and textual features, such as Gabor wavelet, local binary patterns, movement of the brow, movement of eyelids, movement of cheeks, movement of the nose, movement of the nasolabial fold, movement of the lips, movement of the chin, movement of the mouth, and the like.

At activity 506, decision module 210 of immersive guidance system 110 generates statistical features (which may be referred to as decision features), which may comprise, but are not limited to, blink frequency, fixation frequency, saccade frequency, fixation dispersion total, fixation dispersion maximum, average saccade duration, average saccade amplitude, average saccade latency, amplitude of eye movement, and the like. Upon fusion, decision module 210 converts the decision features into a matrix tensor. At activity 508, classification module 206 of immersive guidance system 110 builds a response classifier to predict a user response. According to embodiments, classification module 206 generates the response classifier by superimposing the matrix tensor with one or more social effects and/or historical data 262. In embodiments, the response classifier may comprise a basic expression (e.g., happy, sad, contemptuous, etc.), as well as a compound expression (e.g., complex expression, abnormal expression, micro expression, etc.) corresponding to the response predicted for the user. Using the response classifier, recommendation engine 212 of immersive guidance system 110 generates one or more suggested actions for the user.

FIG. 6 illustrates method 600 of action recommendation based on BCI signals, in accordance with an embodiment. Method 600 may be performed by an immersive guidance system, such as immersive guidance system 110 of FIG. 1. Method 600 comprises one or more activities, which although described in a particular order, may be performed in one or more permutations, according to particular needs.

At activity 602, interface module 202 of immersive guidance system 110 collects attributes of a displayed item at different levels and tracks the focus and emotional state of a user. At activity 604, recommendation engine 212 of immersive guidance system 110 calculates action-based similarity. Based on the action-based similarity, at activity 606, recommendation engine 212 generates a recommendation score of action similarity. At activity 608, recommendation engine 212 applies collaborative filtering on user-user similarity. Based on the collaborative filtering of user-user similarity, at activity 610, recommendation engine 212 identifies or predicts a most similar user to the current user. Using a response classifier, which in embodiments may be determined based on method 500 of FIG. 5, recommendation engine 212 combines the action similarity score generated at activity 606 and the user-user similarity generated at activity 610 and superimposes the response classifier to generate a combined adaptive weighting scheme at activity 612.

According to an embodiment, recommendation engine 212 uses the combined adaptive weighting scheme to identify the top n suggested actions the user is expected to perform at activity 614. By way of example only and not by way of limitation, recommendation engine 212 may determine that the user is selecting an item from an array of items, but a particular attribute of the item is unliked by the user. Continuing this example, immersive guidance system 110 determines that the user likes the particular item displayed on an output device associated with supply chain execution system 100 (such as, for example, an augmented reality display of interface module 202), but the user does not like the color of the item. Recommendation engine 212 determines the top n actions that the user is expected to perform in this particular environment by utilizing the input from the response classifier combined with the environmental variables and the historical information.

Figure 7:
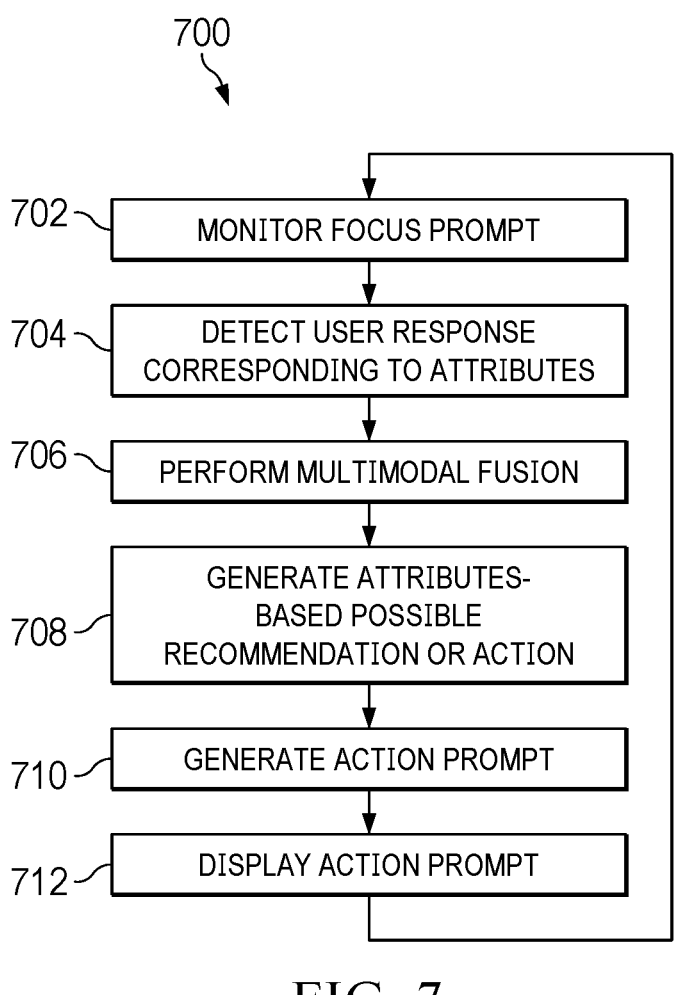
FIG. 7 illustrates a method of supply chain execution using immersive guidance, in accordance with an embodiment.

FIG. 7 illustrates method 700 of supply chain execution using immersive guidance, in accordance with an embodiment. Method 700 may be performed by an immersive guidance system, such as immersive guidance system 110 of FIG. 1. Method 700 proceeds by one or more activities, which although described in a particular order, may be performed in one or more permutations, according to particular needs.

At activity 702, immersive guidance system 110, via one or more sensing devices 170, monitors a focus prompt of the user. As described in greater detail above, immersive guidance system 110 may monitor the focus prompt using one or more input streams, including facial expressions, BCI, VUI, and eye movement, or by the use of input devices, including mice, keyboards, touchscreens, and the like.

At activity 704, immersive guidance system 110, via input received from one or more sensing devices 170, detects a user response on attributes. In embodiments, immersive guidance system 110 may detect the user response via a mixed reality device or augmented reality device, such as an AR glass device.

At activity 706, immersive guidance system 110 performs multimodal fusion based on the detected user response. According to embodiments, immersive guidance system 110 may perform the multimodal fusion using method 400 described above with respect to FIG. 4.

At activity 708, immersive guidance system 110 generates an attributes-based recommended action or task. In the example of a warehouse management system, the attributes-based recommended action may include picking or packing various products of a warehouse, or any other warehouse task. Although a warehouse management system is used in the example of FIG. 7, immersive guidance system 110 may generate recommendations or actions for any supply chain execution interface or system.

At activity 710, immersive guidance system 110 generates an action prompt for the recommended action generated at activity 708 to the user, such as marking a pick as complete, bringing up a next tote move, marking a pack as complete, or other action corresponding to a warehouse execution task.

At activity 712, immersive guidance system 110 displays the action prompt generated at activity 710 to the user via an augmented reality or mixed reality device. For example, when the action prompt is to pick a particular product from a warehouse, immersive guidance system 110 may display a prompt on an AR glass of the user which specifies what product to be picked and in what quantity, highlight a product location when the product location is in view of the user, or indicate directions to the product location when the product location is not in view of the user. After activity 712, immersive guidance system 110 may return to activity 702 and repeat activities 702-712. In embodiments, activities 702-712 of method 700 may be iteratively repeated until all supply chain execution tasks are completed, until a user using immersive guidance system 110 exits the task performance location, or until immersive guidance system 110 is turned off.

Figure 8:
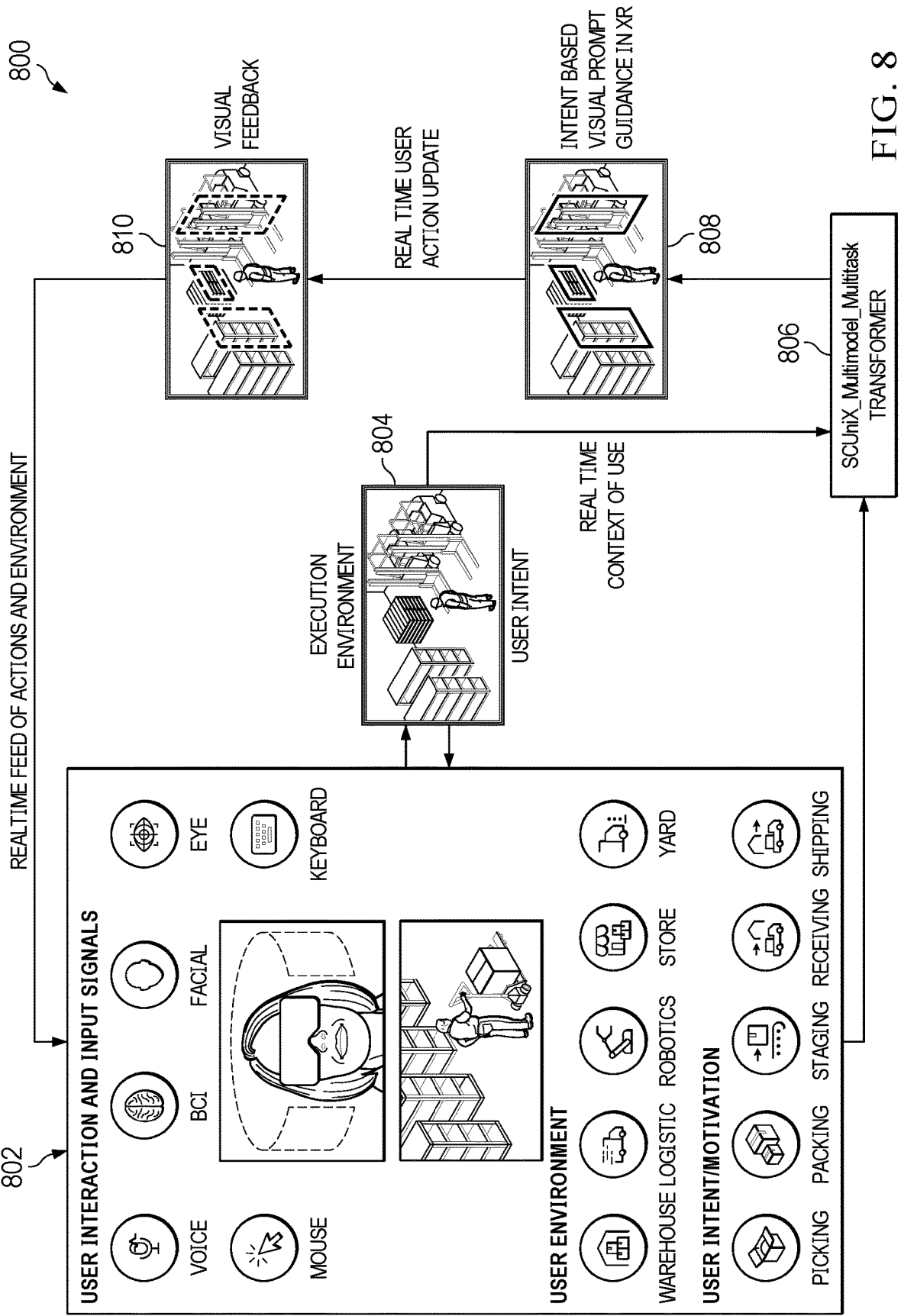
FIG. 8 illustrates an example method of immersive guidance using an execution platform, such as a warehouse management system, in accordance with an embodiment.

FIG. 8 illustrates example method 800 of immersive guidance using an execution platform, such as a warehouse management system, in accordance with an embodiment. Method 800 may be performed by an immersive guidance system, such as immersive guidance system 110 of FIG. 1. Method 800 proceeds by one or more activities, which although described in a particular order, may be performed in one or more permutations, according to particular needs.

At activity 802, immersive guidance system 110 monitors and receives user interaction and input signals, a user environment, and a user intent and/or motivation from a user via one or more sensing devices 170, as described in greater detail above. In embodiments comprising a supply chain execution platform, a user may browse tasks to perform based on roles and responsibilities associated with the user. In the example of FIG. 8, the user of immersive guidance system 110 is a picker, who may need to perform tasks such as locating products, picking certain quantities, and placing the picked products in staging areas, in drop-off areas, or on drop-off equipment. As an additional example, a packer using immersive guidance system 110 may need to sort items that have been picked using a relevant container for packing and shipping orders. In the illustrated embodiment, immersive guidance system 110 utilizes one or more sensing devices 170 to monitor focus using, for example, eye tracking, and sentiment using, for example, eye saccade, dilation, and/or BCI signals.

At activity 804, immersive guidance system 110 detects a user intent within a supply chain execution environment from user input signals. In the illustrated example, the user is within a picking area of an inventory storage supply chain site, and the user intent is detected using an AR glass of the user that tracks eye movements and facial expressions. In addition, or as an alternative, immersive guidance system 110 may determine the focus prompt using one or more of the cursor position, eye cornea reflection tracking, active tab position, and the like. Continuing the example of a picker, immersive guidance system 110 may detect that the picker, based at least partially on his role as a picker, has an intent to perform a picking task, which may involve picking a quantity of a particular item from a location, placing the picked item(s) into a particular box or container, and depositing the box or container into a depositing or staging area. In embodiments, immersive guidance system 110 may utilize geographical mapping to identify a particular user environment, such as by using real-time location data or GPS data.

At activity 806 (which according to embodiments may occur substantially simultaneously with activity 804), fusion module 208 (SCUniX_Multimodel_Multitask Transformer) of immersive guidance system 110 detects user inputs and interactions and uses a multitask transformer to determine associated focus prompts and action prompts. Continuing the example of a picker above, possible focus prompts may include "what to pick," "how much," and "where to place," and may be based on eye cornea reflection tracking and facial expressions, among other user inputs or user interactions. As an additional example, action prompts for a packer may include "right size to pick," "quantity to update," and "move the container," and may be based on BCI evoked response generation, user voice utterances, facial expressions and sentiments, and keyboard entry, among other user inputs or user interactions.

At activity 808, immersive guidance system 110 displays immersive guidance comprising an intent-based visual prompt using augmented reality. Immersive guidance system 110 may generate the intent-based visual prompt based on sentiment-attribute based actions, such as using method 600 for action recommendations, as described in further detail above. In this example, the immersive display highlights, in augmented reality, a product to be picked, a pallet to load the product onto, and a forklift to place the pallet on before loading. In other examples, the immersive display may highlight any product location, packing material, packing equipment, or other materials or equipment to complete a packing task or any other supply chain execution task.

At activity 810, immersive guidance system 110 updates the immersive guidance display to provide visual feedback to the user based on real-time user action updates received from one or more sensing devices 170. Continuing the example of a picker, immersive guidance system 110 may monitor the actions and input to one or more sensing devices 170 of the picker in response to the immersive guidance display to display updated highlighting or other guidance. For example, when the picker picks up an incorrect product, the immersive guidance display may be updated to indicate the error and provide instructions to return the incorrect product to its original location. In embodiments, immersive guidance system 110 may display the immersive guidance sequentially. For example, at first only a product location may be highlighted. Then, based on monitoring of the actions of the user, when the user picks the product, immersive guidance system 110 may remove the highlighting from the production location and highlight a drop-off or loading location, such as a pallet. Immersive guidance system 110 may sequentially display all steps of a task until the task is completed. In embodiments, as the immersive guidance is presented to the user (and throughout method 800), immersive guidance system 110 continuously monitors user input and feedback to generate dynamic recommendations as per the sentiment profile of the user.

Figure 9:
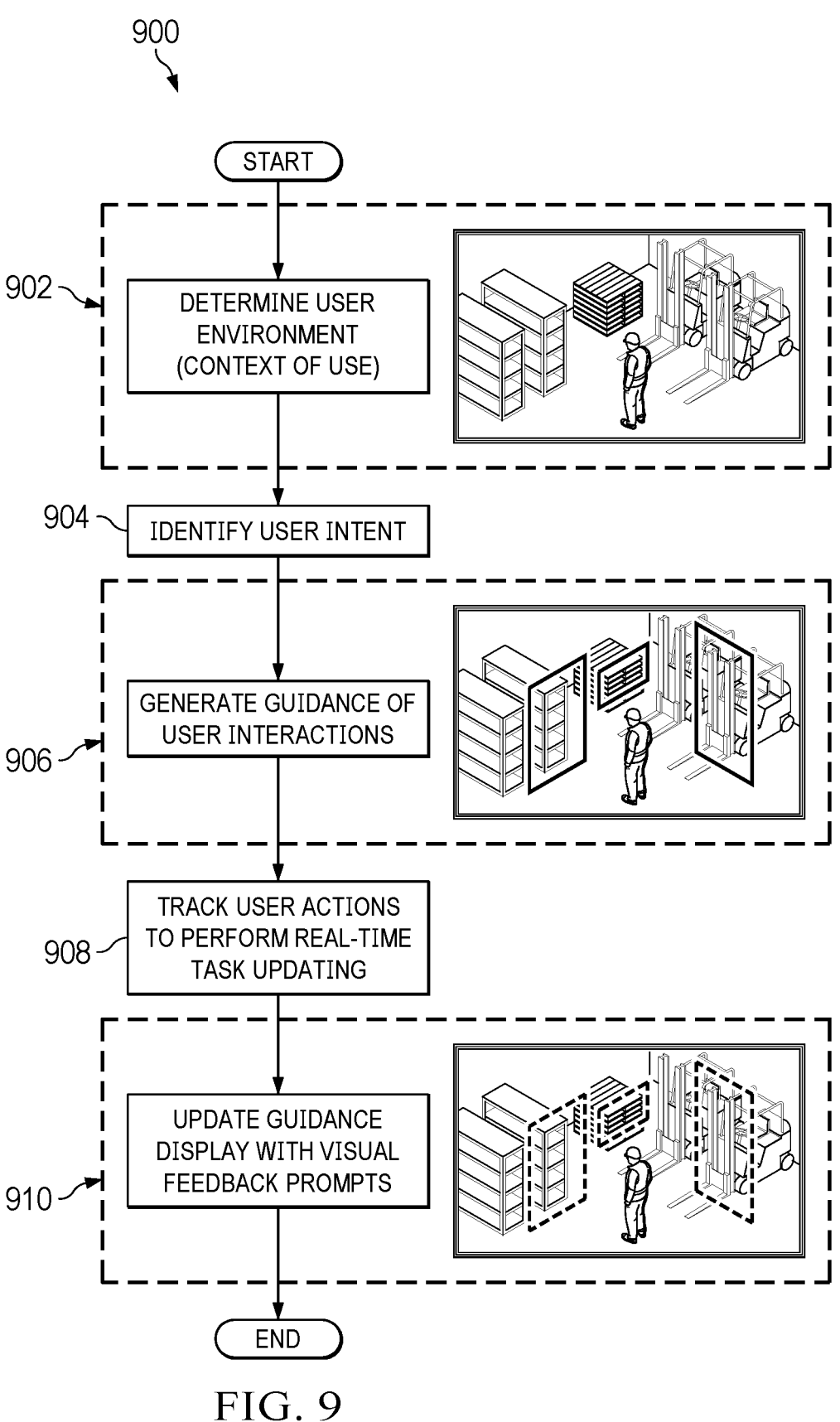
FIG. 9 illustrates an example method of performing supply chain execution tasks using immersive guidance, in accordance with an embodiment.

FIG. 9 illustrates example method 900 of performing supply chain execution tasks using immersive guidance, in accordance with an embodiment. Method 900 may be performed by an immersive guidance system, such as immersive guidance system 110 of FIG. 1. Method 900 proceeds by one or more activities, which although described in a particular order, may be performed in one or more permutations, according to particular needs.

At activity 902, immersive guidance system 110 determines a user environment or context of use for a user of immersive guidance system 110. In the example of a supply chain execution environment, the user may check what operations and tasks to perform in the area that the user is located. As illustrated in FIG. 9, the user of immersive guidance system 110 may be in a product picking area that includes, for example, products, pallets, and forklifts, among other inventory, materials, and equipment. In embodiments, immersive guidance system 110 may determine the user context by using a direct task assignment method, such as a list of tasks assigned to the user, or an indirect task assignment method, such as by accessing workforce data associated with the user to determine a user role and responsibilities. In the example of a picker as the user, immersive guidance system 110 may determine that the picker has tasks to pick five of Item ABC123 from location 98BCD, place the five of Item ABC123 on a pallet of Type A, and then use a forklift to deposit the pallet to Staging Lane X12.

At activity 904, immersive guidance system 110 identifies a user intent within the user environment. According to embodiments, the user intent may include a series of "what to do" prompts for the user, which may walk the user through the steps of completing various supply chain execution tasks. Immersive guidance system 110 may identify the user intent based on the user role associated with the user and the user context determined at activity 902. Continuing the example of the picker, immersive guidance system 110 may identify the user intent as an intent to initiate a pick task. Immersive guidance system 110 may then determine that to fulfill the user intent of initiating the pick task, the picker needs a pallet of Type A and a trolley or other moving cart to transport boxes.

At activity 906, immersive guidance system 110 generates guidance of user interactions comprising guidance of where and how to perform tasks within the user environment. Immersive guidance system 110 may then display the guidance to the user via immersive extended reality (XR) or augmented reality. As illustrated in FIG. 9, immersive guidance system 110 may display the guidance by highlighting various equipment or materials that the user may require, such as a cart, a pallet, and a forklift, which are all required to perform a particular task. Continuing the above example of the picker, immersive guidance system 110 may generate and display guidance showing the picker which trolley or moving cart to use, the location of Item ABC123, the location of pallets of Type A, and the location of the forklift to be used.

At activity 908, immersive guidance system 110 tracks user actions to perform real time task updating using physical to digital mapping. For example, immersive guidance system 110 may detect user actions that may identify action prompts of the user, such as an object being picked, placed, or moved. As the user performs task actions, immersive guidance system 110 may capture actions of the user and automatically update guidance in real time without any input from the user apart from the captured actions. Continuing the example of the picker above, immersive guidance system 110 may detect that the picker has performed the first step of picking Item ABC123, and thereafter update the user intent and action prompts to determine a next step in the pick task, which may be moving the five of Item ABC123 to the location of the pallets of Type A.

At activity 910, immersive guidance system 110 updates the guidance displayed to the user over immersive XR or augmented reality with visual feedback prompts based on what actions, steps, sub-steps, movements, and the like that the user has performed. Immersive guidance system 110 may determine the actions, steps, sub-steps, movements, and the like that the user has performed by capturing various forms of user input, as described in further detail above. In embodiments, when the user has correctly completed one or more actions of the task, immersive guidance system 110 may update the guidance to display a next step or action of the task. However, when the user has not correctly performed one or more actions, immersive guidance system 110 may update the guidance to display corrective measures to correct the incorrectly performed action. As illustrated in FIG. 9, immersive guidance system 110 may display the guidance by altering the highlighting such as by changing colors or intensity. Continuing the example of the picker, immersive guidance system 110 may, after determining that the next step in the pick task is to move the five of Item ABC123 to the location of the pallet of Type A, update the guidance to show the location of or directions to pallets of Type A.

Figure 10A:
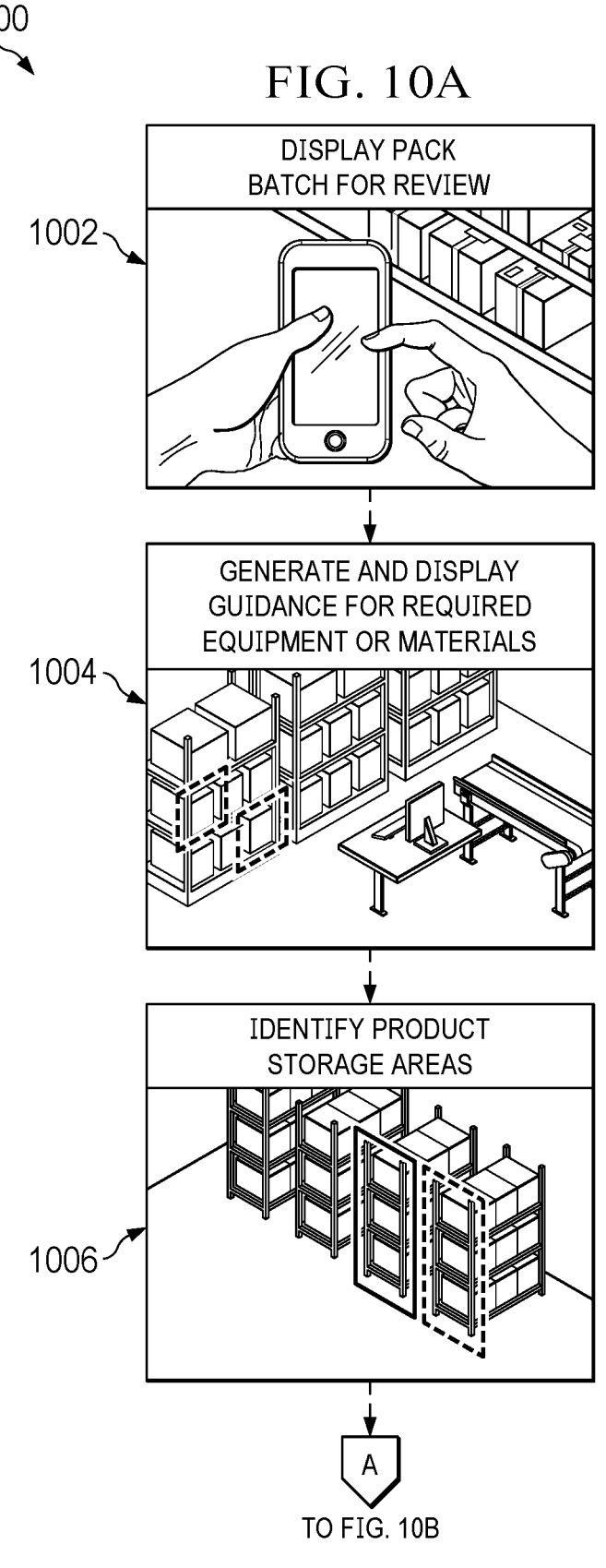
FIGS. 10A-10C illustrate an example method for immersive guidance of a pack task, in accordance with an embodiment.
Figure 10B:
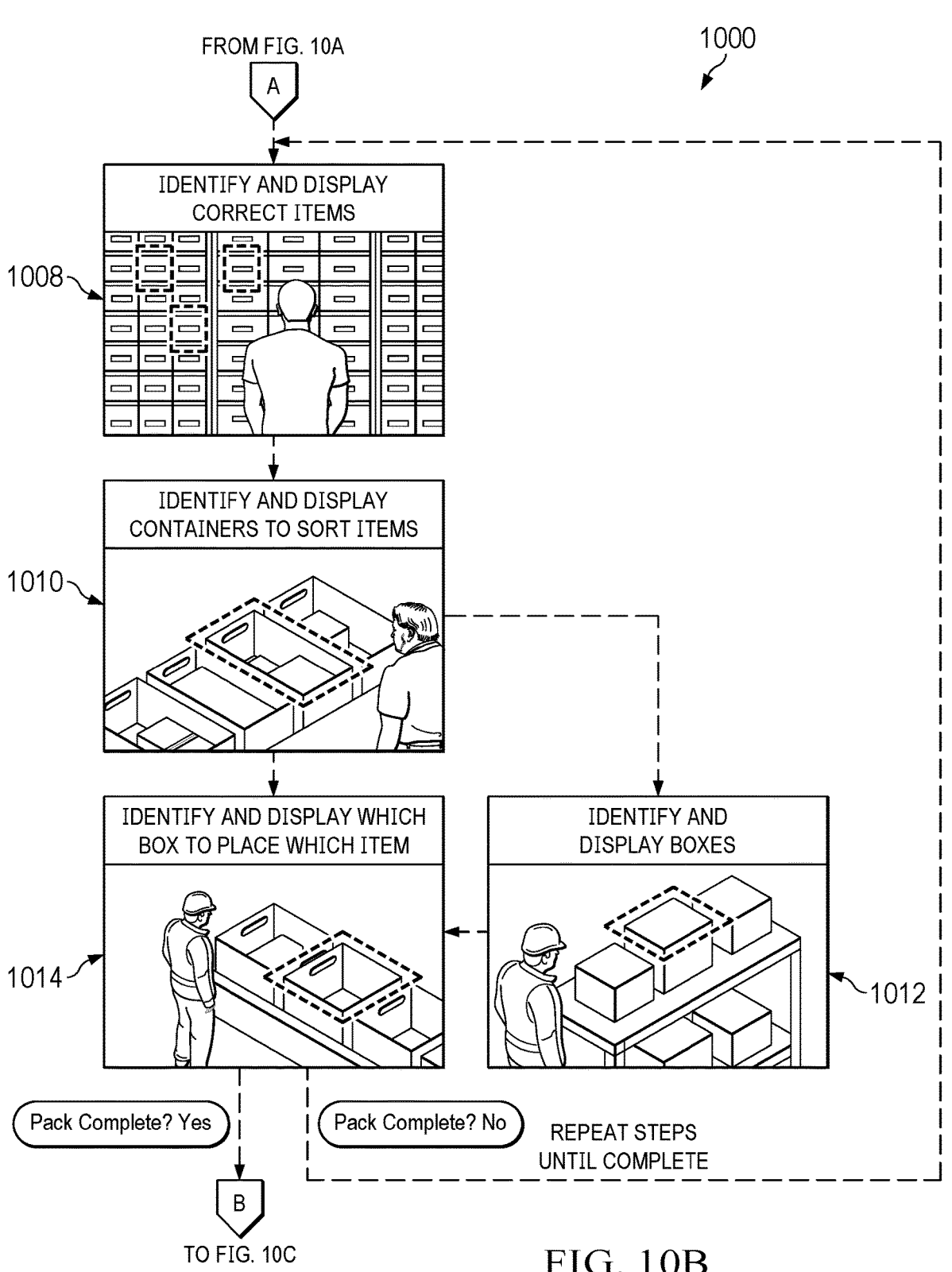
Figure 10C:
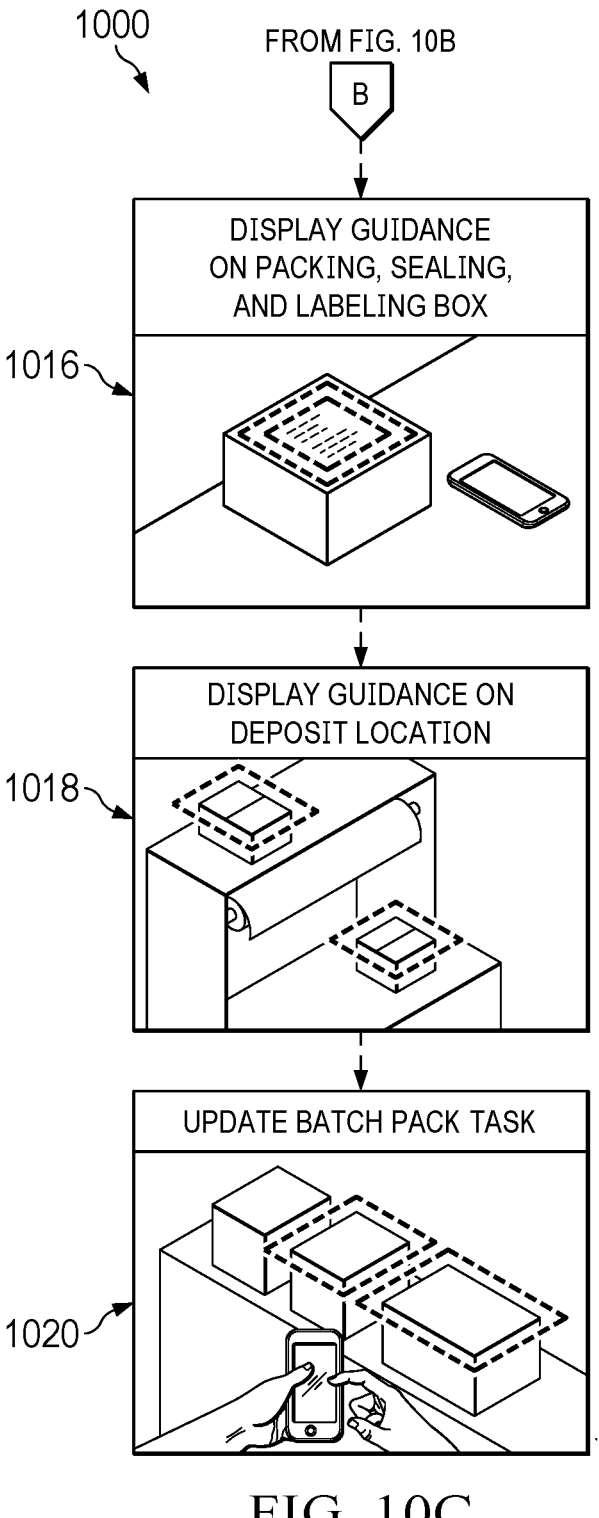

FIGS. 10A-10C illustrate example method 1000 for immersive guidance of a pack task, in accordance with an embodiment. Method 1000 may be performed by an immersive guidance system, such as immersive guidance system 110 of FIG. 1. Method 1000 proceeds by one or more activities, which although described in a particular order, may be performed in one or more permutations, according to particular needs.

FIG. 10A illustrates an initiation stage of the pack task. At activity 1002, immersive guidance system 110 displays to a user of immersive guidance system 110, such as a packer, a list of items and quantities to pack for a set of orders, enabling the packer to review a pack batch. In embodiments, immersive guidance system 110 may display the list of items and quantities over a user device associated with the packer, such as a cell phone, tablet, computer, AR glass, or any other device that includes an output device associated with the user.

At activity 1004, immersive guidance system 110 generates and displays guidance to the packer showing required equipment or materials for the pack task. For example, the required equipment and materials may include containers of a particular type and size and a quantity thereof, as well as equipment to transport the containers or items to be picked. At activity 1006, immersive guidance system 110 identifies the product storage areas or totes where the items to be picked are located.

FIG. 10B illustrates an execution stage of the pack task. Continuing from the initiation stage of the pack task shown in FIG. 10A, at activity 1008, immersive guidance system 110 displays guidance identifying the correct items to be picked from a tote or product storage area. For example, a single tote or product storage area may include multiple items from multiple orders, and immersive guidance system 110 may highlight or otherwise provide guidance to the correct items to be picked from the tote.

At activity 1010, after determining that the correct items have been picked, immersive guidance system 110 displays guidance identifying the containers in which to sort the items picked at activity 1008, such as by highlighting or otherwise distinguishing a container to be used. When there is no shipping box to place the items sorted into the containers, at activity 1012, immersive guidance system 110 displays guidance on shipping boxes to pick to complete the pack task. When there is a shipping box, or once the packer has picked the shipping boxes, at activity 1014, immersive guidance system 110 displays guidance on what shipping box or boxes to place the items from the container. According to embodiments, immersive guidance system 110 may repeat activities 1008-1014 as necessary until all items of the pack task have been sorted into shipping boxes.

FIG. 10C illustrates a completion stage of the pack task. Continuing from the execution stage of the pack task shown in FIG. 10B, at activity 1016, immersive guidance system 110 displays guidance on how to pack the items into the shipping box and how to seal and label the shipping box. At activity 1018, immersive guidance system 110, after determining that the shipping box has been correctly sealed and labeled, may display guidance showing where to deposit the shipping box within a deposit or drop-off area. At activity 1020, after determining that the shipping box has been correctly deposited, immersive guidance system 110 updates the batch pack task to indicate completion, enabling further processing such as shipping, delivery, or hand-over to a customer. In embodiments, after activity 1020, method 1000 may return to activity 1002, within the initiation stage, to execute a second pack task, and so on.

Figure 11A:
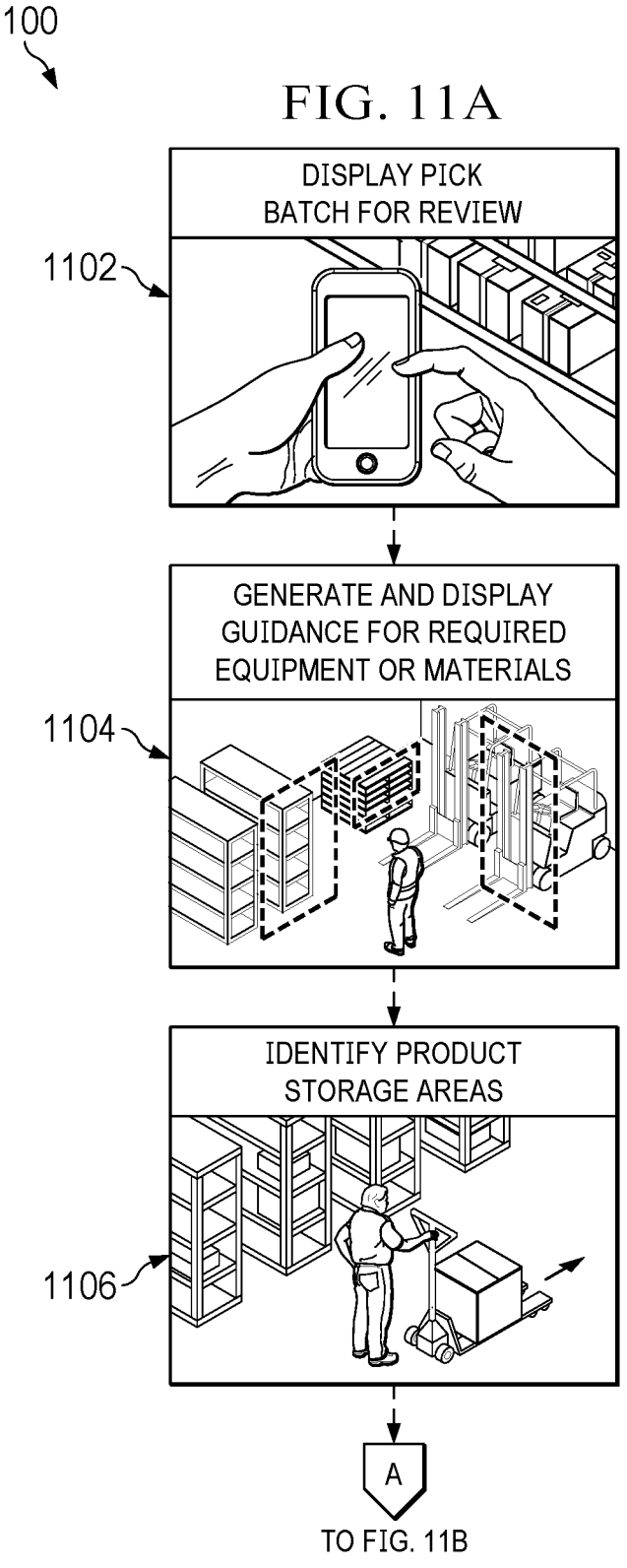
FIGS. 11A-11C illustrate an example method for immersive guidance of a pick task, in accordance with an embodiment.
Figure 11B:
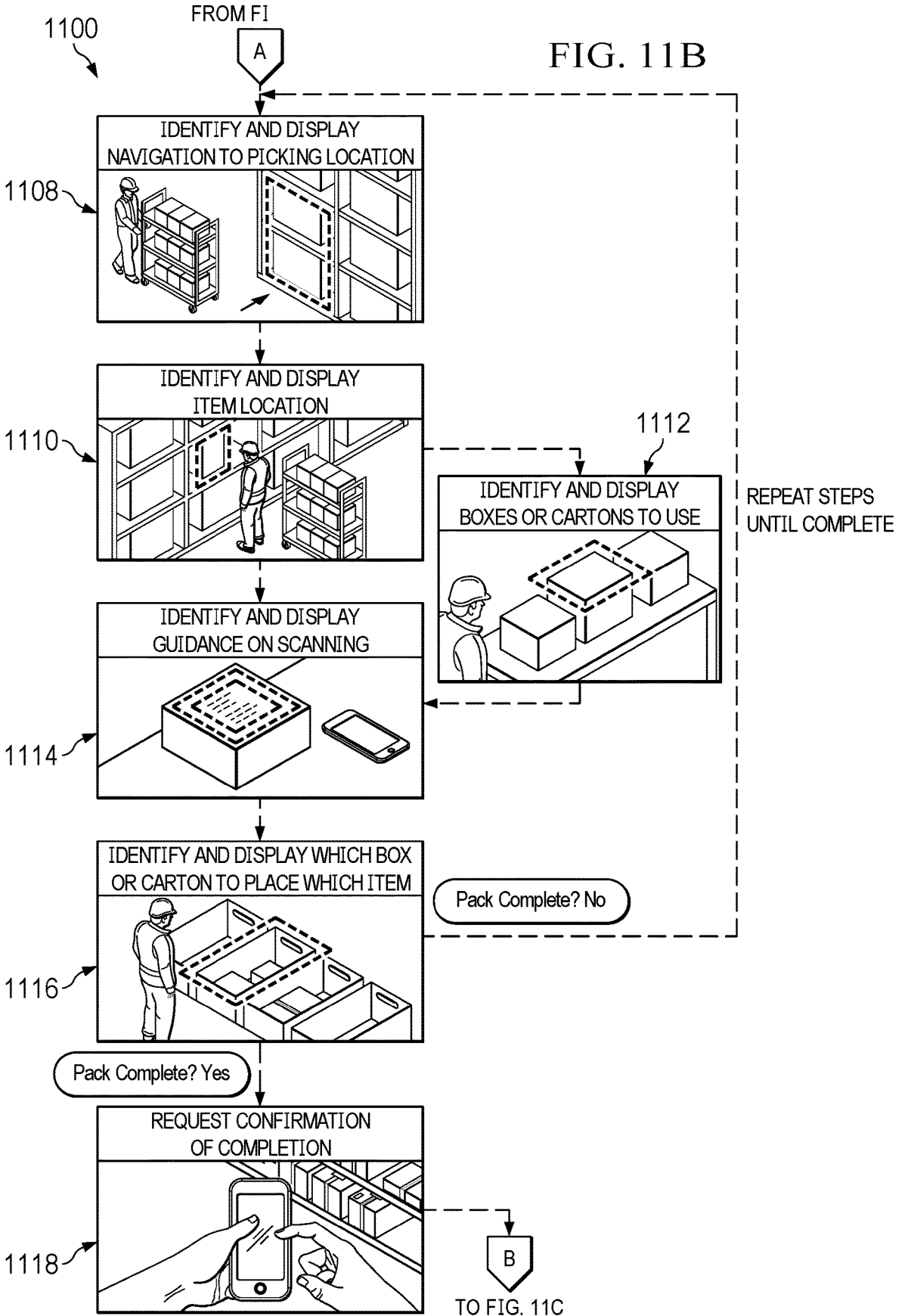
Figure 11C:
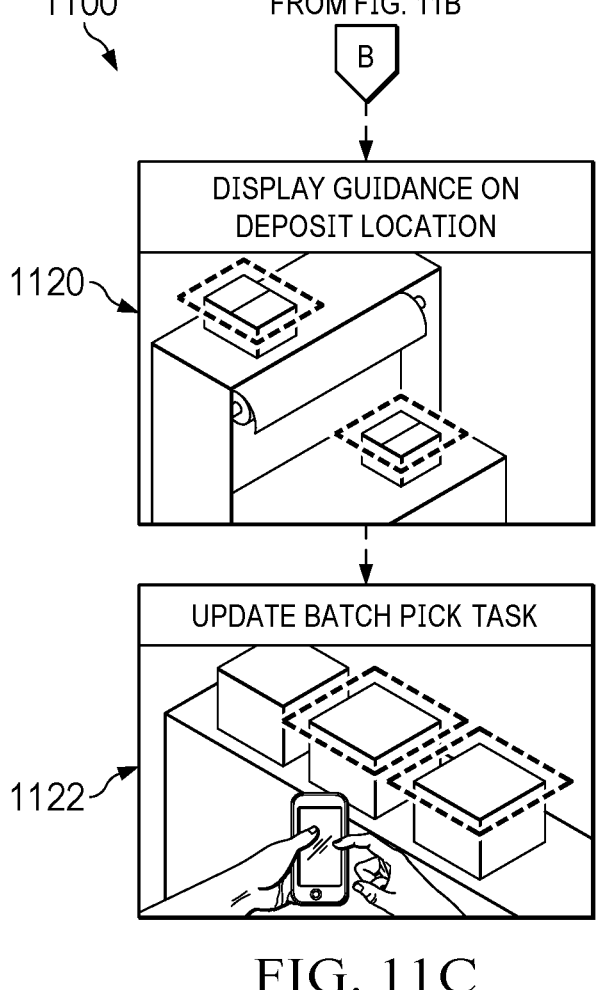

FIGS. 11A-11C illustrate example method 1100 for immersive guidance of a pick task, in accordance with an embodiment. Method 1100 may be performed by an immersive guidance system, such as immersive guidance system 110 of FIG. 1. Method 1100 proceeds by one or more activities, which although described in a particular order, may be performed in one or more permutations, according to particular needs.

FIG. 11A illustrates an initiation stage of the pick task. At activity 1102, immersive guidance system 110 displays to a user of immersive guidance system 110, such as a picker, a list of items and quantities to pick for a set of orders, enabling the picker to review a pick batch. In embodiments, immersive guidance system 110 may display the list of items and quantities over a user device associated with the picker, such as a cell phone, tablet, computer, AR glass, or any other device that includes an output device associated with the user.

At activity 1104, immersive guidance system 110 generates and displays guidance to the picker showing required equipment or materials for the pick task. For example, the required equipment and materials may include containers of a particular type and size, such as pallets or containers, and a quantity thereof, as well as equipment to transport the containers or items to be picked, such as pallet jacks, hand carts, trolleys, forklifts, or other equipment. At activity 1106, immersive guidance system 110 identifies zones of the warehouse or inventory storage area where the items to be picked are located and determines optimal picking routes to perform the pick task.

FIG. 11B illustrates an execution stage of the pick task. Continuing from the initiation stage of the pick task shown in FIG. 11A, at activity 1108, immersive guidance system 110 displays guidance of navigation to a designated location of the warehouse where the items to be picked are located. After the picker has entered the designated location, at activity 1110, immersive guidance system 110 displays updated guidance showing the exact location of the items within the designated area, such as on a particular shelf or aisle. In embodiments, immersive guidance system 110 may highlight the items to picked using immersive XR or augmented reality.

When there is no box or container to place the items, at activity 1112, immersive guidance system 110 displays guidance on boxes or container to pick to complete the pick task. When there is a box or container, or once the picker has picked the required boxes or containers, at activity 1114, immersive guidance system 110 displays guidance on scanning the box or container, using either a headset worn by the packer or a mobile scanner. At activity 1116, immersive guidance system 110 displays guidance on what boxes or containers to place the items picked from the designated area.

According to embodiments, immersive guidance system 110 may repeat activities 1108-1116 as necessary until all items of the pick task have been placed into appropriate boxes or containers. Once all items have been placed into boxes, at activity 1118, immersive guidance system 110 displays guidance comprising a confirmation that all items have been picked and accounted for.

FIG. 11C illustrates a completion stage of the pick task. Continuing from the execution stage of the pick task shown in FIG. 11B, at activity 1120, immersive guidance system 110 displays guidance showing where to deposit the boxes or containers in which the items have been placed within a deposit or drop-off area. At activity 1122, after determining that the boxes or containers have been correctly deposited, immersive guidance system 110 updates the batch pick task to indicate completion, enabling further processing such as packing, shipping, delivery, or hand-over to a customer. In embodiments, after activity 1122, method 1100 may return to activity 1102, within the initiation stage, to execute a second pick task, and so on.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for immersive guidance using a supply chain execution platform, comprising:
   a computer, comprising a processor and a memory, the computer configured to:
      monitor and receive input comprising user interaction and user input signals of a user;
      detect a user intent within a supply chain execution environment from the user input signals;
      determine associated focus prompts and action prompts, wherein the focus prompts are determined based on eye cornea reflection tracking using a corneal tracking sensor and facial expressions using a facial action coding camera;
      display immersive guidance comprising an intent-based visual prompt using augmented reality, wherein the intent-based visual prompt comprises one or more recommended actions corresponding to a supply chain execution system; and
      update the immersive guidance based on real-time user action updates received from one or more sensing devices.

2. The system of claim 1, wherein the immersive guidance comprises guidance for directing the user sequentially through steps of a particular task.

3. The system of claim 1, wherein the computer is further configured to:
   update the immersive guidance to display corrective measures to correct an incorrectly performed action.

4. The system of claim 1, wherein the immersive guidance highlights one or more of a product location, one or more packing materials, packing equipment, or one or more materials or equipment to complete a packing task.

5. The system of claim 1, wherein the one or more sensing devices monitor focus of the user using eye tracking and sentiment, wherein the sentiment is obtained from eye saccade, eye dilation or brain computer interface signals.

6. A computer-implemented method for immersive guidance using a supply chain execution platform, comprising:
   monitoring and receiving, by a computer comprising a processor and a memory, input comprising user interaction and user input signals of a user;
   detecting, by the computer, a user intent within a supply chain execution environment from the user input signals;
   determining, by the computer, associated focus prompts and action prompts, wherein the focus prompts are determined based on eye cornea reflection tracking using a corneal tracking sensor and facial expressions using a facial action coding camera;
   displaying, by the computer, immersive guidance comprising an intent-based visual prompt using augmented reality, wherein the intent-based visual prompt comprises one or more recommended actions corresponding to a supply chain execution system; and
   updating, by the computer, the immersive guidance based on real-time user action updates received from one or more sensing devices.

7. The computer-implemented method of claim 6, wherein the immersive guidance comprises guidance for directing the user sequentially through steps of a particular task.

8. The computer-implemented method of claim 6, further comprising:

updating, by the computer, the immersive guidance to display corrective measures to correct an incorrectly performed action.

9. The computer-implemented method of claim 6, wherein the immersive guidance highlights one or more of a product location, one or more packing materials, packing equipment, or one or more materials or equipment to complete a packing task.

10. The computer-implemented method of claim 6, wherein the one or more sensing devices monitor focus of the user using eye tracking and sentiment, wherein the sentiment is obtained from eye saccade, eye dilation or brain computer interface signals.

11. A non-transitory computer-readable medium embodied with software for immersive guidance using a supply chain execution platform, the software when executed is configured to:

monitor and receive, by a computer comprising a processor and a memory, input comprising user interaction and user input signals of a user;

detect a user intent within a supply chain execution environment from the user input signals;

determine associated focus prompts and action prompts, wherein the focus prompts are determined based on eye cornea reflection tracking using a corneal tracking sensor and facial expressions using a facial action coding camera;

display immersive guidance comprising an intent-based visual prompt using augmented reality, wherein the intent-based visual prompt comprises one or more recommended actions corresponding to a supply chain execution system; and update the immersive guidance based on real-time user action updates received from one or more sensing devices.

12. The non-transitory computer-readable medium of claim 11, wherein the immersive guidance comprises guidance for directing the user sequentially through steps of a particular task.

13. The non-transitory computer-readable medium of claim 11, wherein the software when executed is further configured to:

update the immersive guidance to display corrective measures to correct an incorrectly performed action.

14. The non-transitory computer-readable medium of claim 11, wherein the immersive guidance highlights one or more of a product location, one or more packing materials, packing equipment, or one or more materials or equipment to complete a packing task.

* * * * *